US012750837B2

(12) United States Patent
Kim et al.

(10) Patent No.: US 12,750,837 B2
(45) Date of Patent: Sep. 29, 2026

(54) METHOD FOR TRANSMITTING AND RECEIVING PUSCH IN WIRELESS COMMUNICATION SYSTEM, AND APPARATUS THEREFOR

(71) Applicant: LG ELECTRONICS INC., Seoul (KR)

(72) Inventors: Jaehyung Kim, Seoul (KR); Joonkui Ahn, Seoul (KR); Youngdae Lee, Seoul (KR); Kijun Kim, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 446 days.

(21) Appl. No.: 18/272,167

(22) PCT Filed: Jan. 13, 2022

(86) PCT No.: PCT/KR2022/000675

§ 371 (c)(1),
(2) Date: Jul. 13, 2023

(87) PCT Pub. No.: WO2022/154538

PCT Pub. Date: Jul. 21, 2022

(65) Prior Publication Data

US 2024/0147450 A1 May 2, 2024

Related U.S. Application Data

(60) Provisional application No. 63/137,649, filed on Jan. 14, 2021.

(51) Int. Cl.

*H04W 72/044* (2023.01)
*H04L 1/08* (2006.01)
*H04W 72/232* (2023.01)

(52) U.S. Cl.

CPC ............. *H04W 72/046* (2013.01); *H04L 1/08* (2013.01); *H04W 72/232* (2023.01)

(58) Field of Classification Search

CPC ............. H04W 72/046; H04W 72/232; H04W 72/1268; H04L 1/08; H04L 5/00;

(Continued)

(56) References Cited

U.S. PATENT DOCUMENTS

| | | | | |
|---|---|---|---|---|
| 2014/0241242 A1* | 8/2014 | Josiam | H04W 88/08 | 370/328 |
| 2015/0009951 A1* | 1/2015 | Josiam | H04L 25/0224 | 370/330 |

(Continued)

FOREIGN PATENT DOCUMENTS

| | | |
|---|---|---|
| WO | 2018084331 | 5/2018 |
| WO | 2022035762 | 2/2022 |

(Continued)

OTHER PUBLICATIONS

PCT International Application No. PCT/KR202/000675, International Search Report dated Apr. 29, 2022, 4 pages.

(Continued)

*Primary Examiner* — John D Blanton
(74) *Attorney, Agent, or Firm* — LEE, HONG, DEGERMAN, KANG & WAIMEY

(57) ABSTRACT

The present specification proposes a method for transmitting and receiving a PUSCH in a wireless communication system, and an apparatus therefor. The method, carried out by a base station, may comprise the steps of: transmitting, to a terminal, configuration information including information regarding an uplink resource and information regarding a transmission beam, wherein a transmission beam of the terminal is determined on the basis of the information regarding the transmission beam; in an RRC idle state or (Continued)

RRC inactive state, for reception of a PUSCH, switching one or more reception beams; receiving, on the basis of the switching, the PUSCH from the terminal on the uplink resource; and determining an optimal reception beam on the basis of the switching.

20 Claims, 11 Drawing Sheets

(58) Field of Classification Search
CPC ... H04L 5/0053; H04L 1/0026; H04L 1/1671; H04L 1/1864; H04L 1/1893; H04B 7/0695; H04B 7/088; H04B 7/06952
See application file for complete search history.

(56) References Cited

U.S. PATENT DOCUMENTS

2018/0124733 A1* 5/2018 Vilaipornsawai ............ H04W 52/0229
2019/0014568 A1 1/2019 Nilsson et al.
2019/0097874 A1* 3/2019 Zhou ............ H04B 7/06966
2020/0205013 A1 6/2020 John Wilson et al.
2020/0314664 A1 10/2020 Zhou et al.
2020/0350972 A1* 11/2020 Yi ............ H04B 7/088
2020/0383167 A1* 12/2020 Sengupta ............ H04B 7/06964
2021/0159966 A1* 5/2021 Xi ............ H04W 72/046
2021/0203397 A1* 7/2021 Xiong ............ H04W 72/23
2021/0203449 A1* 7/2021 Chatterjee ............ H04L 1/1896
2021/0337503 A1* 10/2021 Takeda ............ H04W 24/08
2021/0352510 A1* 11/2021 Zhang ............ H04B 7/0632
2021/0360579 A1* 11/2021 Sakhnini ............ H04W 68/04
2022/0030620 A1* 1/2022 Cirik ............ H04W 16/28
2022/0046623 A1* 2/2022 Xiong ............ H04L 1/1819
2022/0046716 A1* 2/2022 Chai ............ H04L 5/0048
2022/0132587 A1* 4/2022 Agiwal ............ H04L 1/1887
2022/0159767 A1* 5/2022 Zhang ............ H04L 5/0053
2022/0210798 A1* 6/2022 Tsai ............ H04L 5/0051
2022/0210816 A1* 6/2022 Wu ............ H04B 7/0408
2022/0210860 A1* 6/2022 Chin ............ H04W 72/23
2022/0225286 A1* 7/2022 Cirik ............ H04W 72/23
2022/0303910 A1* 9/2022 Zhang ............ H04W 52/367
2022/0304035 A1* 9/2022 Zhang ............ H04W 72/23
2022/0330317 A1* 10/2022 Lee ............ H04W 72/1268
2022/0337303 A1* 10/2022 Li ............ H04W 56/001
2022/0386407 A1* 12/2022 Kim ............ H04L 1/1861
2023/0046727 A1* 2/2023 Jung ............ H04W 16/28
2023/0072763 A1* 3/2023 Kim ............ H04W 74/0841
2023/0144750 A1* 5/2023 Agiwal ............ H04W 48/12 455/422.1
2023/0156782 A1* 5/2023 Li ............ H04L 1/08 370/329
2023/0164585 A1* 5/2023 Li ............ H04L 5/0091 370/329
2023/0189380 A1* 6/2023 Palat ............ H04W 76/11 370/329
2023/0189387 A1* 6/2023 Jeon ............ H04W 72/23 370/242
2023/0198731 A1* 6/2023 Cao ............ H04L 5/0094 370/277
2023/0262631 A1* 8/2023 Lei ............ H04W 56/0045 370/350
2023/0262688 A1* 8/2023 Kiilerich Pratas .. H04W 72/542 370/329
2023/0269811 A1* 8/2023 Shibaike ............ H04W 74/006 370/329
2023/0283352 A1* 9/2023 Mu ............ H04B 7/06952 375/267
2023/0284289 A1* 9/2023 Watts ............ H04W 48/20 370/329
2023/0337239 A1* 10/2023 Lei ............ H04L 5/0051
2023/0344497 A1* 10/2023 Wang ............ H04L 5/005
2023/0344583 A1* 10/2023 Yi ............ H04L 5/0053
2023/0396373 A1* 12/2023 Gao ............ H04L 1/1861
2023/0397015 A1* 12/2023 Liu ............ H04B 7/024
2024/0007168 A1* 1/2024 Goyal ............ H04B 7/024
2024/0008036 A1* 1/2024 Choi ............ H04W 72/0446
2024/0040583 A1* 2/2024 Liu ............ H04W 76/20
2024/0057108 A1* 2/2024 Yi ............ H04L 1/1854
2024/0063880 A1* 2/2024 Ling ............ H04B 7/06952
2024/0064736 A1* 2/2024 Lin ............ H04W 72/1268
2024/0064756 A1* 2/2024 Lin ............ H04L 5/0053
2024/0064842 A1* 2/2024 Ye ............ H04W 52/0212
2024/0072871 A1* 2/2024 Wu ............ H04W 72/046
2024/0073892 A1* 2/2024 Lin ............ H04W 72/23
2024/0098797 A1* 3/2024 Liu ............ H04W 56/0045
2024/0121776 A1* 4/2024 Kim ............ H04B 7/0695
2024/0147450 A1* 5/2024 Kim ............ H04L 1/1893
2025/0287326 A1* 9/2025 Jung ............ H04B 7/088

FOREIGN PATENT DOCUMENTS

WO WO-2022154511 A1 * 7/2022 ............ H04W 24/08
WO WO-2022154538 A1 * 7/2022 ............ H04L 5/00
WO 2022216048 10/2022

OTHER PUBLICATIONS

3rd Generation Partnership Project; Technical Specification Group Radio Access Network; NR; Radio Resource Control (RRC) protocol specification (Release 16), 3GPP TS 38.331 V16.3.1, Jan. 2021, 932 pages.
European Patent Office Application Serial No. 22739731.2, Search Report dated Nov. 4, 2024, 10 pages.
InterDigital, "Beam selection and maintenance for CG-based SDT," 3GPP RAN WG3 Meeting #112e, R2-2010108, Oct. 2020, 3 pages.
Huawei et al., "Discussion on CG-based scheme," 3GPP TSG-RAN WG2 #112-e, R2-2010281, Oct. 2020, 17 pages.

* cited by examiner

METHOD FOR TRANSMITTING AND RECEIVING PUSCH IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2022/000675, filed on Jan. 13, 2022, which claims the benefit of U.S. Provisional Application No. 63/137,649, filed on Jan. 14, 2021, the contents of which are all incorporated by reference herein in their entirety.

TECHNICAL FIELD

The present disclosure relates to a wireless communication system, and more particularly to a method of transmitting and receiving a physical uplink shared channel (PUSCH) and a device therefor.

BACKGROUND

Mobile communication systems have been developed to provide a voice service while ensuring the activity of a user. However, the area of the mobile communication systems has extended to a data service in addition to a voice. Due to the current explosive increase in traffic, there is a shortage of resources, and thus users demand a higher speed service. Accordingly, there is a need for a more advanced mobile communication system.

Requirements for next-generation mobile communication systems need to able to support the accommodation of explosive data traffic, a dramatic increase in data rate per user terminal, the accommodation of a significant increase in the number of connected devices, very low end-to-end latency, and high-energy efficiency. To this end, studies have been conducted on various technologies such as dual connectivity, massive multiple input multiple output (MIMO), in-band full duplex, non-orthogonal multiple access (NOMA), super wideband support, and device networking.

Techniques for transmitting and receiving data in a radio resource control (RRC) idle state are being discussed.

SUMMARY

The present disclosure provides a method of transmitting and receiving an uplink channel (or information/data) without transition from an RRC idle state or an RRC inactive state to a connected state, and a device therefor.

The present disclosure also provides a method of determining/updating a transmit (Tx) beam in an RRC idle state or an RRC inactive state in a system supporting multiple beams, and a device therefor.

The present disclosure also provides a method of receiving a PUSCH using beam sweeping and determining an optimal receive (Rx) beam, and a device therefor.

The present disclosure also provides a method of efficiently transmitting and receiving infrequent small data in an RRC idle state or an RRC inactive state, and a device therefor.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

In one aspect of the present disclosure, there is provided a method of receiving a physical uplink shared channel (PUSCH) in a wireless communication system. The method performed by a base station (BS) may comprise transmitting, to a user equipment (UE), configuration information including information for an uplink resource and information for a transmit (Tx) beam, a Tx beam of the UE being determined based on the information for the Tx beam, switching one or more receive (Rx) beams, for a PUSCH reception, in a radio resource control (RRC) idle state or an RRC inactive state, receiving, from the UE, the PUSCH in the uplink resource based on the switching, and determining an optimal Rx beam based on the switching.

The optimal Rx beam may be used for an uplink reception after the PUSCH reception.

The method may further comprise transmitting, to the UE, downlink control information (DCI) including hybrid automatic repeat request-acknowledgement (HARQ-ACK) information for the PUSCH.

The DCI may be transmitted based on a Tx beam related to the optimal Rx beam.

The DCI may further include information for updating the Tx beam of the UE.

The PUSCH may be repeatedly transmitted by the UE N times based on one Tx beam.

The number N of repetition transmissions may be the same as a number of synchronization signal block (SSB) beams, a number of Tx beams supported by the UE, or a number of Rx beams supported by the BS.

In another aspect of the present disclosure, there is provided a base station (BS) configured to receive a physical uplink shared channel (PUSCH) in a wireless communication system, the BS comprising at least one transceiver, at least one processor, and at least one memory operably connected to the at least one processor, wherein the at least one memory is configured to store instructions that allow the at least one processor to perform operations based on being executed by the at least one processor, wherein the operations comprise transmitting, to a user equipment (UE), configuration information including information for an uplink resource and information for a transmit (Tx) beam, a Tx beam of the UE being determined based on the information for the Tx beam, switching one or more receive (Rx) beams, for a PUSCH reception, in a radio resource control (RRC) idle state or an RRC inactive state, receiving, from the UE, the PUSCH in the uplink resource based on the switching, and determining an optimal Rx beam based on the switching.

The optimal Rx beam may be used for an uplink reception after the PUSCH reception.

The operations may further comprise transmitting, to the UE, downlink control information (DCI) including hybrid automatic repeat request-acknowledgement (HARQ-ACK) information for the PUSCH.

In another aspect of the present disclosure, there is provided a method of transmitting, by a user equipment (UE), a physical uplink shared channel (PUSCH) in a wireless communication system, the method comprising receiving, from a base station (BS), configuration information including information for an uplink resource and information for a transmit (Tx) beam, determining a Tx beam based on the information for the Tx beam, and repeatedly transmitting, to the BS, the PUSCH in the uplink resource N times based on the Tx beam in a radio resource control (RRC) idle state or an RRC inactive state, wherein the PUSCH is received based on a switching of the BS, and wherein an optimal Rx beam of the BS is determined based on the switching of the BS.

The number N of repetition transmissions may be the same as a number of synchronization signal block (SSB) beams, a number of Tx beams supported by the UE, or a number of Rx beams supported by the BS.

The optimal Rx beam may be used by the BS for an uplink reception after a PUSCH reception.

The method may further comprise receiving, from the BS, downlink control information (DCI) including hybrid automatic repeat request-acknowledgement (HARQ-ACK) information for the PUSCH.

The DCI may be transmitted by the BS based on a Tx beam related to the optimal Rx beam.

The DCI may further include information for updating the Tx beam.

In another aspect of the present disclosure, there is provided a user equipment (UE) configured to transmit a physical uplink shared channel (PUSCH) in a wireless communication system, the UE comprising at least one transceiver, at least one processor, and at least one memory operably connected to the at least one processor, wherein the at least one memory is configured to store instructions that allow the at least one processor to perform operations based on being executed by the at least one processor, wherein the operations comprise receiving, from a base station (BS), configuration information including information for an uplink resource and information for a transmit (Tx) beam, determining a Tx beam based on the information for the Tx beam, and repeatedly transmitting, to the BS, the PUSCH in the uplink resource N times based on the Tx beam in a radio resource control (RRC) idle state or an RRC inactive state, wherein the PUSCH is received based on a switching of the BS, and wherein an optimal Rx beam of the BS is determined based on the switching of the BS.

The number N of repetition transmissions may be the same as a number of synchronization signal block (SSB) beams, a number of Tx beams supported by the UE, or a number of Rx beams supported by the BS.

In another aspect of the present disclosure, there is provided a processing apparatus configured to control a base station (BS) to receive a physical uplink shared channel (PUSCH) in a wireless communication system, the processing apparatus comprising at least one processor, and at least one memory operably connected to the at least one processor, wherein the at least one memory is configured to store instructions that allow the at least one processor to perform operations based on being executed by the at least one processor, wherein the operations comprise transmitting, to a user equipment (UE), configuration information including information for an uplink resource and information for a transmit (Tx) beam, a Tx beam of the UE being determined based on the information for the Tx beam, switching one or more receive (Rx) beams, for a PUSCH reception, in a radio resource control (RRC) idle state or an RRC inactive state, receiving, from the UE, the PUSCH in the uplink resource based on the switching, and determining an optimal Rx beam based on the switching.

In another aspect of the present disclosure, there is provided a computer readable storage medium storing at least one instruction, wherein the at least one instruction is configured to allow at least one processor to control operations based on being executed by the at least one processor, wherein the operations comprise transmitting, to a user equipment (UE), configuration information including information for an uplink resource and information for a transmit (Tx) beam, a Tx beam of the UE being determined based on the information for the Tx beam, switching one or more receive (Rx) beams, for a physical uplink shared channel (PUSCH) reception, in a radio resource control (RRC) idle state or an RRC inactive state, receiving, from the UE, the PUSCH in the uplink resource based on the switching, and determining an optimal Rx beam based on the switching.

The present disclosure can improve signaling overhead and UE power consumption by transmitting and receiving an uplink channel (or information/data) without transition from an RRC idle state or an RRC inactive state to a connected state.

The present disclosure can also improve communication reliability by determining/updating a Tx beam in an RRC idle state or an RRC inactive state in a system supporting multiple beams.

The present disclosure can also determine an optimal Rx beam without an additional procedure of acquiring a beam by receiving a PUSCH using beam sweeping and determining an optimal Rx beam.

The present disclosure can also efficiently transmit and receive infrequent small data in an RRC idle state or an RRC inactive state.

Effects that could be achieved with the present disclosure are not limited to those that have been described hereinabove merely by way of example, and other effects and advantages of the present disclosure will be more clearly understood from the following description by a person skilled in the art to which the present disclosure pertains.

BRIEF DESCRIPTION OF THE DRAWINGS

The accompanying drawings, which are included to provide a further understanding of the present disclosure and constitute a part of the detailed description, illustrate embodiments of the present disclosure and serve to explain technical features of the present disclosure together with the description.

DETAILED DESCRIPTION

Figure 1:
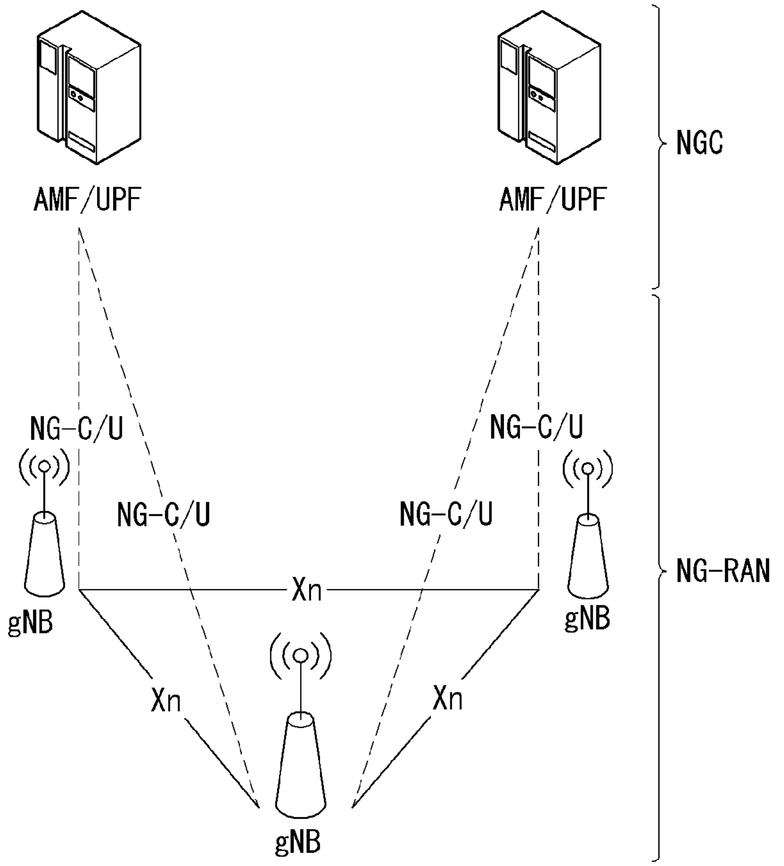
FIG. 1 illustrates an example of an overall system structure of NR to which a method described in the present disclosure is applicable.

Reference will now be made in detail to embodiments of the disclosure, examples of which are illustrated in the accompanying drawings. A detailed description to be disclosed below together with the accompanying drawing is to describe exemplary embodiments of the disclosure and not to describe a unique embodiment for carrying out the disclosure. The detailed description below includes details to provide a complete understanding of the disclosure. However, those skilled in the art know that the disclosure may be carried out without the details.

In some cases, in order to prevent a concept of the disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In downlink, the transmitter may be part of the terminal and the receiver may be part of the terminal. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the disclosure is described based on the 3GPP communication system (e.g., LTE-A or NR), but the technical spirit of the disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. Matters disclosed in a standard document opened before the disclosure may be referred to for a background art, terms, abbreviations, etc., used for describing the disclosure. For example, the following documents may be referred to.

3GPP LTE

- 36.211: Physical channels and modulation
- 36.212: Multiplexing and channel coding
- 36.213: Physical layer procedures
- 36.300: Overall description
- 36.331: Radio Resource Control (RRC)

3GPP NR

- 38.211: Physical channels and modulation
- 38.212: Multiplexing and channel coding
- 38.213: Physical layer procedures for control
- 38.214: Physical layer procedures for data
- 38.300: NR and NG-RAN Overall Description
- 38.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of megabits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Abbreviation Definition

UE: User Equipment
MO: Mobile Originated
MT: Mobile Terminated
PUR: Preconfigured UL Resource
CG: Configured Grant
SSB: Synchronization Signal Block
UL: Uplink
DL: Downlink
RRC IE: Radio Resource Control Information Element
SRI: SRS Resource Indicator
CRI: CSI-RS Resource Indicator
SSBRI: SSB Resource Indicator
RSRP: Reference Signal Received Power
BD: Blind Detection
RACH: Random Access Channel
SRS: Sounding Reference Signal
PUR SS: PUR Search Space. A search space that a PUR UE monitors to receive downlink feedback information (information for HARQ operation, etc.), UL grant DCI, DL assignment DCI, and the like, after PUR transmission.

Overview of System

FIG. 1 illustrates an example of an overall structure of an NR system to which a method proposed in the disclosure may be applied.

Referring to FIG. 1, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

NR (New Rat) Numerology and Frame Structure

In the NR system, multiple numerologies may be supported. The numerologies may be defied by subcarrier spacing and a CP (Cyclic Prefix) overhead. Spacing between the plurality of subcarriers may be derived by scaling basic subcarrier spacing into an integer N (or $\mu$). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| $\mu$ | $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as two types of frequency ranges (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 2:
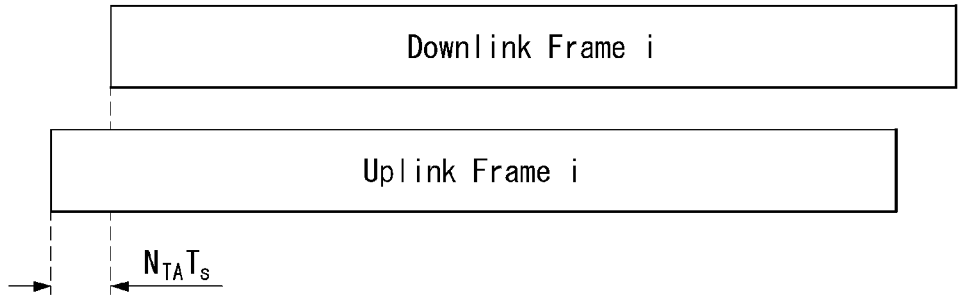
FIG. 2 illustrates a relationship between an uplink frame and a downlink frame in a wireless communication system to which a method described in the present disclosure is applicable.

FIG. 2 illustrates the relation between an uplink frame and a downlink frame in a wireless communication system to which a method proposed in the disclosure may be applied.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $$n_s^\mu \in \{0, \ldots, N_{subframe}^{slots,\mu} - 1\}$$

within a subframe and are numbered in increasing order of $$n_{s,f}^\mu \in \{0, \ldots, N_{frame}^{slots,\mu} - 1\}$$

within a radio frame. One slot consists of consecutive OFDM symbols of $$N_{symb}^\mu, \text{ and } N_{symb}^\mu$$

is determined depending on a numerology used and slot configuration. The start of slots $$n_s^\mu$$

in a subframe is aligned in time with the start of OFDM symbols $$n_s^\mu N_{symb}^\mu$$

in the same subframe.

Not all UEs are able to transmit and receive at the same time, and this means that not all OFDM symbols in a downlink slot or an uplink slot are available to be used.

Table 3 represents the number $$N_{symb}^{slot}$$

of OFDM symbols per slot, the number $$N_{slot}^{frame,\mu}$$

of slots per radio frame, and the number $$N_{slot}^{subframe,\mu}$$

of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

Figure 3:
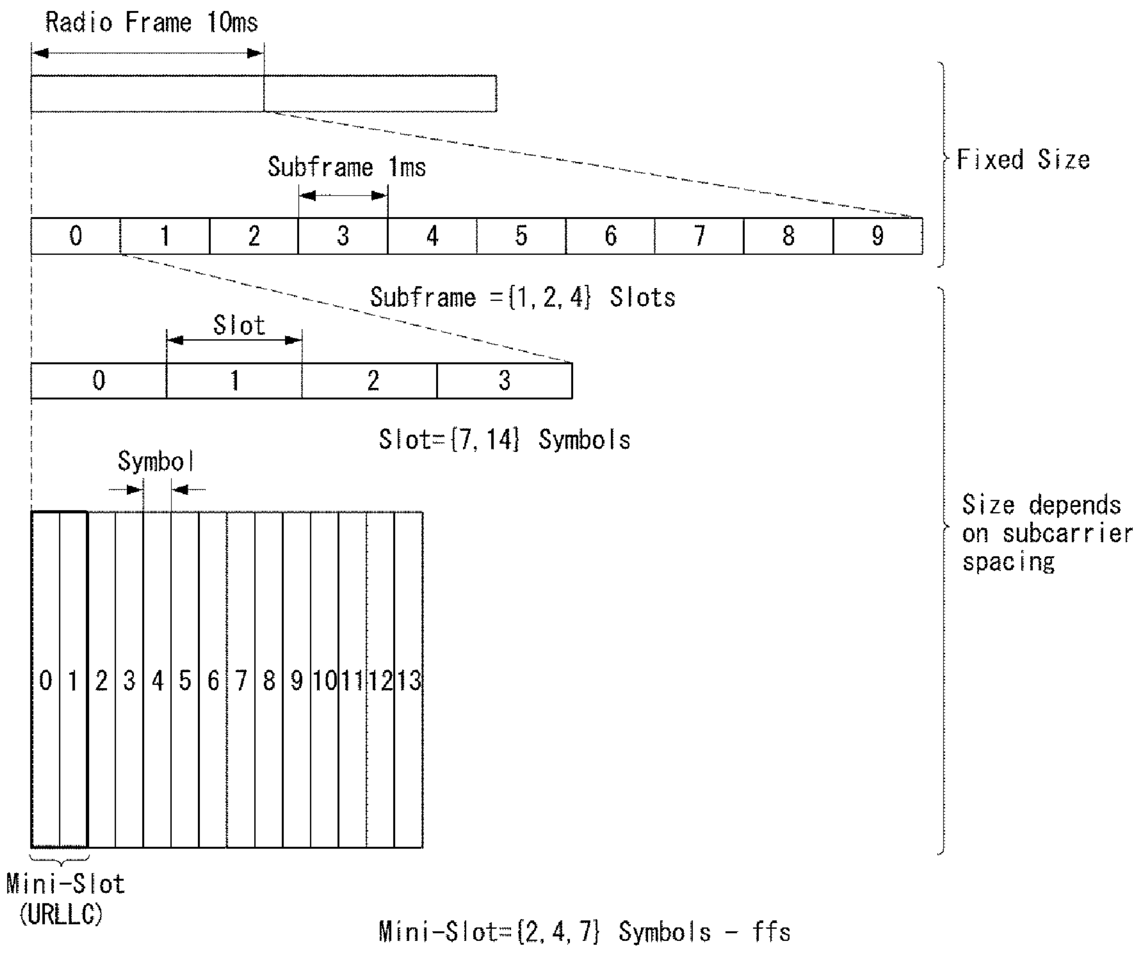
FIG. 3 illustrates an example of a frame structure in an NR system.

FIG. 3 illustrates an example of a frame structure in a NR system. FIG. 3 is merely for convenience of explanation and does not limit the scope of the disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In relation to physical resources in the NR system, an antenna port, a resource grid, a resource element, a resource block, a carrier part, etc., may be considered.

Hereinafter, the above physical resources that may be considered in the NR system are described in more detail.

First, in relation to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. In this case, the large-scale properties may include at least one of delay spread, Doppler spread, frequency shift, average received power, and received timing.

Figure 4:
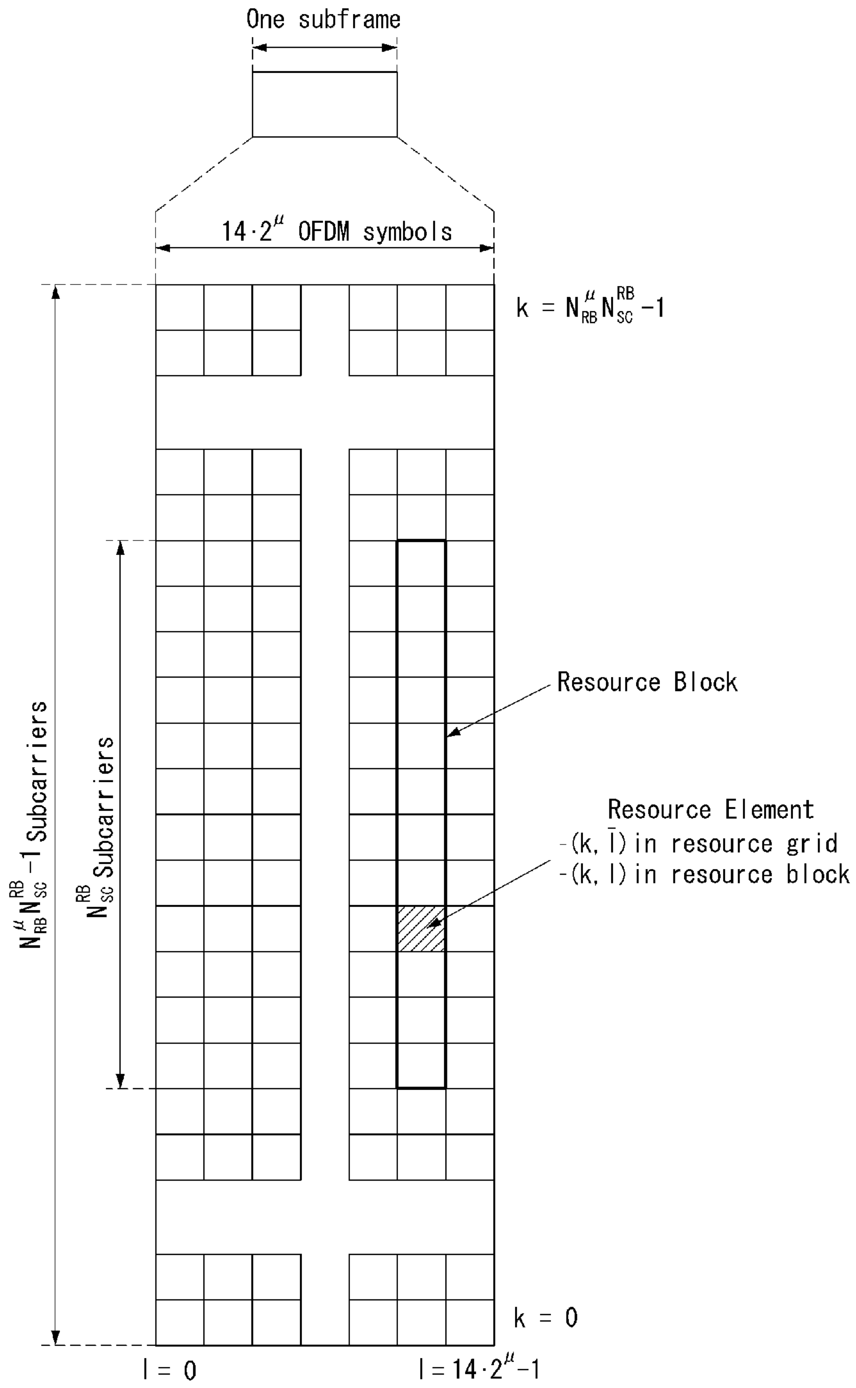
FIG. 4 illustrates an example of a resource grid supported by a wireless communication system to which a method described in the present disclosure is applicable.

FIG. 4 illustrates an example of a resource grid supported in a wireless communication system to which a method proposed in the disclosure may be applied.

Referring to FIG. 4, a resource grid consists of $$N_{RB}^\mu N_{sc}^{RB}$$

subcarriers on a frequency domain, each subframe consisting of 14·2μ OFDM symbols, but the disclosure is not limited thereto.

In the NR system, a transmitted signal is described by one or more resource grids, consisting of $$N_{RB}^\mu N_{sc}^{RB}$$

subcarriers, and $$2^{\mu} N_{symb}^{(\mu)}$$

OFDM symbols, where $$N_{RB}^{\mu} \leq N_{RB}^{max,\mu}.\ N_{RB}^{max,\mu}$$

denotes a maximum transmission bandwidth and may change not only between numerologies but also between uplink and downlink.

Figure 6:
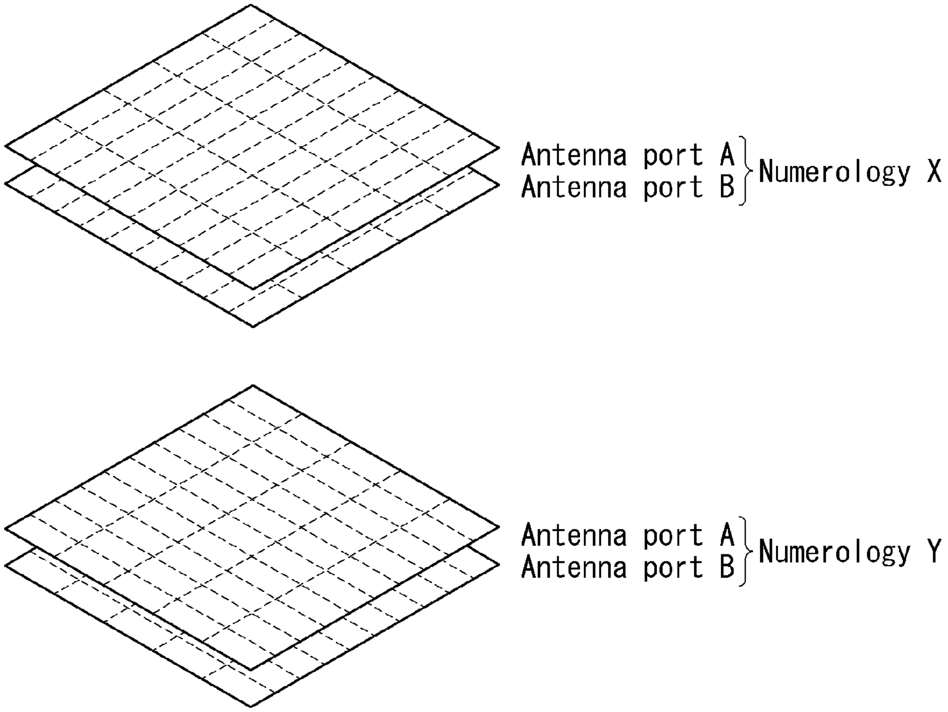
FIG. 6 illustrates examples of a resource grid per antenna port and numerology to which a method described in the present disclosure is applicable.

In this case, as illustrated in FIG. 6, one resource grid may be configured per numerology μ and antenna port p.

Figure 5:
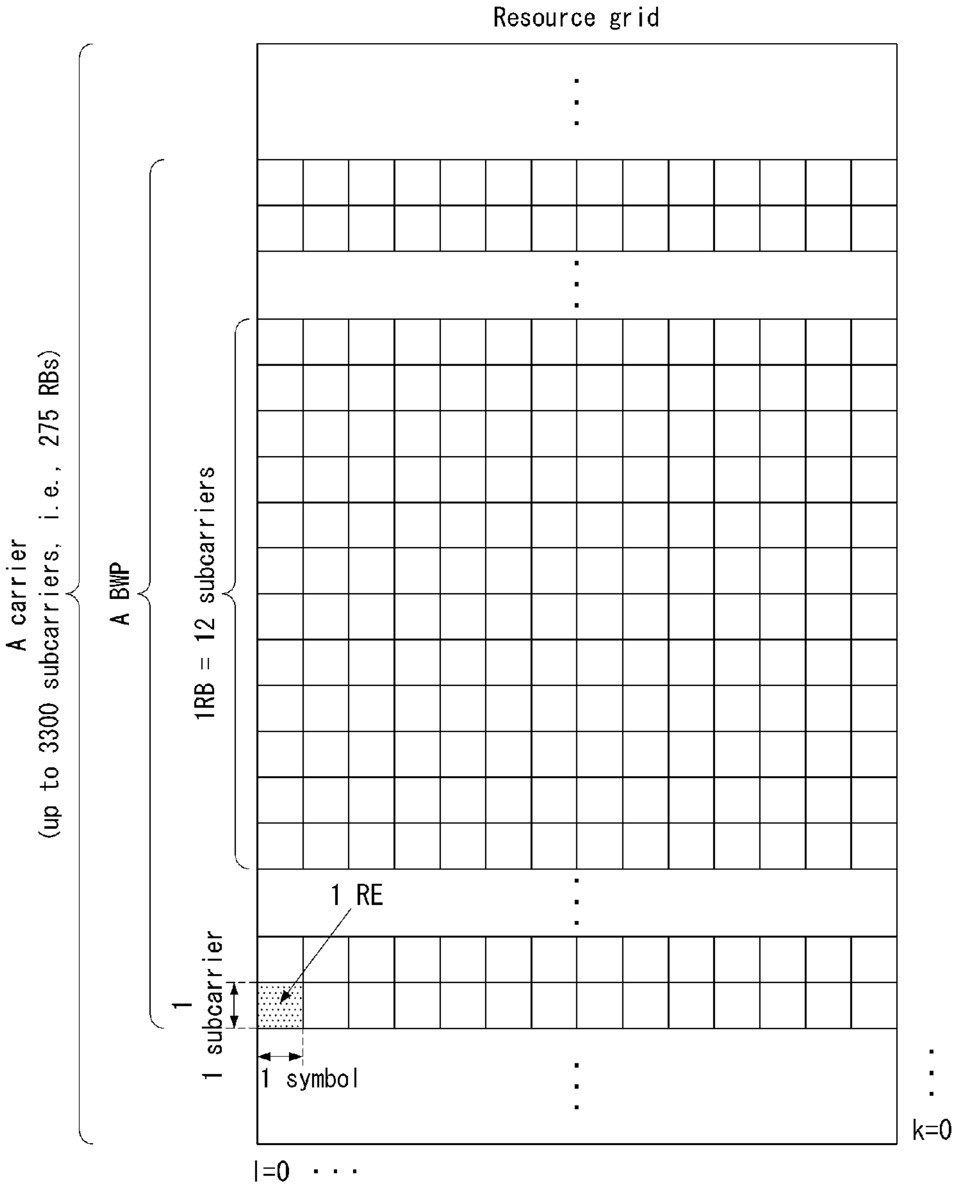
FIG. 5 illustrates a slot structure of an NR frame to which a method described in the present disclosure is applicable.

FIG. 5 illustrates a slot structure of an NR frame to which a method described in the present disclosure is applicable.

A slot includes a plurality of symbols in a time domain. For example, one slot includes 7 symbols in a normal CP, while one slot includes 6 symbols in an extended CP. A carrier includes a plurality of subcarriers in a frequency domain. A resource block (RB) is defined as a plurality of (e.g., 12) consecutive subcarriers in the frequency domain. A bandwidth part (BWP) is defined as a plurality of consecutive (P)RBs in the frequency domain and may correspond to one numerology (e.g., SCS, CP length, etc.). The carrier may include up to N (e.g., 5) BWPs. The data communication may be performed through an activated BWP, and only one BWP may be activated in one UE. In a resource grid, each element is referred to as a resource element (RE), and one complex symbol may be mapped to each RE.

FIG. 6 illustrates examples of a resource grid per antenna port and numerology to which a method proposed in the disclosure is applicable.

Each element of the resource grid for the numerology μ and the antenna port p is called a resource element and is uniquely identified by an index pair (k,$\bar{l}$), where $$k = 0, \ldots, N_{RB}^{\mu} N_{sc}^{RB} - 1$$

is an index on a frequency domain, and $$\bar{l} = 0, \ldots, 2^{\mu} N_{symb}^{(\mu)} - 1$$

refers to a location of a symbol in a subframe. The index pair (k,l) is used to refer to a resource element in a slot, where $$l = 0, \ldots, N_{symb}^{\mu} - 1.$$

The resource element (k,$\bar{l}$) for the numerology μ and the antenna port p corresponds to a complex value $$a_{k,\bar{l}}^{(p,\mu)}.$$

When there is no risk for confusion or when a specific antenna port or numerology is not specified, the indexes p and μ may be dropped, and as a result, the complex value may be $$a_{k,\bar{l}}^{(p)}$$

Further, a physical resource block is defined as $$N_{sc}^{RB} = 12$$

consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $$n_{CRB}^{\mu}$$

in the frequency domain and resource elements (k, l) for the subcarrier spacing configuration may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $$N_{BWP,i}^{size} - 1,$$

where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $$N_{BWP,i}^{start}$$

may be the common resource block where the BWP starts relative to the common resource block 0.

Bandwidth Part (BWP)

An NR system may be supported up to a maximum of 400 MHz per one component carrier (CC). If a terminal operating in such a wideband CC operates with its RF for all CCs being turned on, terminal battery consumption may be increased. Alternatively, if several use cases (e.g., eMBB, URLLC, Mmtc, V2X) operating within one wideband CC are taken into consideration, a different numerology (e.g., sub-carrier spacing) for each frequency band within the corresponding CC may be supported. Alternatively, the capability of a maximum bandwidth may be different for each terminal. A base station may indicate that the terminal operates only in some bandwidth not the full bandwidth of the wideband CC by taking the capacity into consideration. The corresponding some bandwidth is defined as a bandwidth part (BWP), for convenience sake. The BWP may be configured with resource blocks (RBs) contiguous on a frequency axis, and may correspond to one numerology (e.g., sub-carrier spacing, CP length, slot/mini-slot duration).

Meanwhile, a base station may configure multiple BWPs within one CC configure in a terminal. For example, in a PDCCH monitoring slot, a BWP occupying a relatively small frequency domain may be configured, and a PDSCH indicated in a PDCCH may be scheduled on a BWP greater than the configured BWP. Alternatively, if UEs are crowded in a specific BWP, some UEs may be configured in other BWP for load balancing. Alternatively, some spectrum at the center of a full bandwidth may be excluded by taking into consideration frequency domain inter-cell interference cancellation between neighbor cells, and BWPs on both sides may be configured in the same slot. That is, the base station may configure at least one DL/UL BWP in a terminal associated with a wideband CC, may activate at least one DL/UL BWP of DL/UL BWP(s) (by L1 signaling or MAC CE or RRC signaling) configured in a specific time. Switching to another configured DL/UL BWP (by L1 signaling or MAC CE or RRC signaling) may be indicated or switching to a predetermined DL/UL BWP may be performed when a timer value expires based on a timer. In this case, the activated DL/UL BWP is defined as an active DL/UL BWP.

Physical Channel and General Signal Transmission

Figure 7:
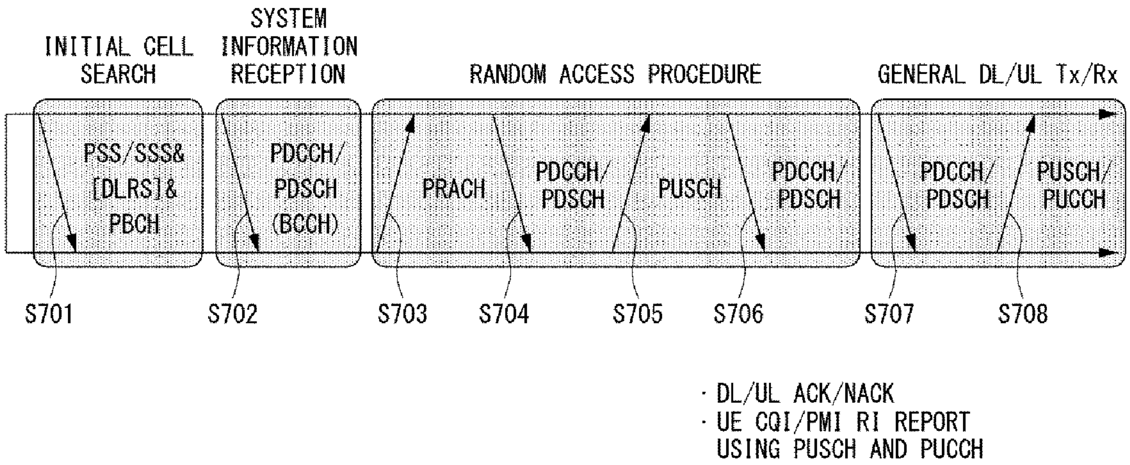
FIG. 7 illustrates physical channels and general signal transmission used in a 3GPP system.

FIG. 7 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S701). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S702).

Meanwhile, when there is no radio resource first accessing the eNB or for signal transmission, the UE may perform a Random Access Procedure (RACH) to the eNB (S703 to S706). To this end, the UE may transmit a specific sequence to a preamble through a Physical Random Access Channel (PRACH) (S703 and S705) and receive a response message (Random Access Response (RAR) message) for the preamble through the PDCCH and a corresponding PDSCH. In the case of a contention based RACH, a Contention Resolution Procedure may be additionally performed (S706).

The UE that performs the above procedure may then perform PDCCH/PDSCH reception (S707) and Physical Uplink Shared Channel (PUSCH)/Physical Uplink Control Channel (PUCCH) transmission (S708) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information transmitted by the UE to the base station or received by the UE from the base station through the uplink may include a downlink/uplink ACK/NACK signal, a channel quality indicator (CQI), a precoding matrix index (PMI), a rank indicator (RI)), etc. The UE may transmit control information, such as CQI/PMI/RI described above, through PUSCH and/or PUCCH.

New Radio (NR) supports the RRC_INACTIVE state in addition to the RRC_IDLE state, and a UE transmitting infrequent (periodic and/or non-periodic) data may be generally indicated by the BS to stay in the RRC_INACTIVE state. Since data transmission in the RRC_INACTIVE state is not supported until Rel-16, a user equipment (UE) shall transition a radio resource control (RRC) connection to a resume (i.e., the RRC_CONNECTED state) so as to transmit UL (e.g., Mobile Originated) and/or DL (e.g., Mobile Terminated) data.

Connection setup for the data transmission and a subsequent return process to the RRC_INACTIVE state are required regardless of the size of data to be transmitted, causing unnecessary power consumption and signaling overhead. This problem becomes particularly serious when the size of the data to be transmitted is small and the transmission frequency is low as follows.

(1) Smartphone Applications:
- Traffic to Instant Messaging (IM) service
- Heart-beat/keep-alive traffic of IM/email clients and other apps
- Push notifications of various applications (2) Non-Smartphone Applications:
- Traffic of wearables (e.g., periodic positioning information, etc.)
- Sensors (e.g., industrial wireless sensor networks transmitting temperature and pressure values periodically or by an event-triggered scheme, etc.)
- Smart meters and smart meter networks transmitting periodic meter readings Excessive signaling overhead that occurs when the NR UE in the RRC_INACTIVE state transmits small data is a rather chronic problem, and as the number of NR UEs increases, the excessive signaling overhead becomes a more critical issue in terms of UE power consumption as well as network performance and efficiency.

In order to solve this problem, a method in which the NR UE transmits uplink (UL) data through a preconfigured uplink resource (PUR) in the RRC_INACTIVE state may be considered. In particular, when considering multi-beam operation support, which is a key differentiation point of NR compared to LTE, a UE supporting UL data transmission in the RRC_INACTIVE state or the RRC_IDLE state through the PUR may perform PUR transmission in the following order.

(1) The UE requests a PUR configuration in the RRC_CONNECTED state and receives the PUR configuration via higher layer signaling.

(2) The UE switches from the RRC_CONNECTED state to the RRC_INACTIVE/RRC_IDLE state (i.e., go to sleep).

(3) Wake up (but still in the RRC_INACTIVE/RRC_IDLE state)

(4) Timing advance (TA)/beam validation (before PUR occasion)

(5) UL Tx beam selection (optional, before PUR occasion)

(6) UL transmission (and optional TA/beam update) (starting at PUR occasion)

(7) Go to sleep (8) Repeat (3) to (7) for each of the PUR occasions (9) As soon as the PUR transmission is completed, the PUR configuration is released through the RRC connection release procedure.

The present disclosure proposes a method for a UE to perform an UL transmission using a pre-configured resource (or PUR (resource)) in an NR system supporting a multi-beam in the overall procedure for the PUR transmission in the RRC_INACTIVE state. For example, proposed methods according to the present disclosure may correspond to the (5) and (6) and/or the (1) of the PUR transmission related BS configuration step in the overall procedure described above. And/or, proposed methods according to the present disclosure may be operations added separately from the (1) to (9) of the overall procedure.

Specifically, the present disclosure proposes a method of configuring and/or selecting/updating an UL Tx beam (hereinafter, first embodiment), a method of configuring an UL Tx beam selection/update periodicity or spacing (hereinafter, second embodiment), and a method of performing beam sweeping for PUR transmission using a multi-beam (hereinafter, third embodiment).

Embodiments described below in the present disclosure are merely distinguished for convenience of explanation. Thus, it is obvious that partial method and/or partial configuration of any embodiment can be substituted or combined with partial method and/or partial configuration of another embodiment.

The proposed methods according to the present disclosure can obtain effects of a reduction in signaling overhead, an improvement in network performance and efficiency due to this, and a reduction in power consumption form a UE perspective by efficiently supporting PUR transmission of an NR UE of RRC_INACTIVE state and/or RRC_IDLE state in an NR system supporting a multi-beam operation.

In the present disclosure, the preconfigured UL resource may be mutually replaced with PUR, preconfigured PUSCH resource, configured grant, configured grant type 1, configured grant (CG), CG type 1, CG resource, and the like. And/or, the PUR transmission may mean an operation in which the UE (in the RRC_INACTIVE/RRC_IDLE state) performs UL transmission using the PUR. For example, the UL may be a physical uplink shared channel (PUSCH). And/or, the PUR transmission may include a series of downlink (DL) reception and/or UL transmission following UL transmission. And/or, the PUR transmission may include DL reception followed by the PUR transmission (PDCCH reception for indicating the availability of a subsequent PUR occasion) or monitoring operation and a subsequent operation accordingly.

In the present disclosure, the PUR occasion or PUR may be referred to as an uplink resource or a resource for PUSCH or a resource based on a configured grant.

In the present disclosure, performing the PUR transmission may mean transmitting (uplink) channel/signal/data/information through uplink resources (i.e., PUR).

In the present disclosure, a PUR UE or a PUR support UE may mean a UE that supports UL transmission using the PUR (in the RRC_INACTIVE/RRC_IDLE state), or a PUR support UE that is indicated and/or configured with the PUR transmission.

A slot, a subframe, a frame, etc. described in embodiments of the present disclosure may be examples of predetermined time units used in a wireless communication system. That is, when applying methods described in the present disclosure, time unit can be replaced by other time units applied to other wireless communication systems.

The contents described above (3GPP system, frame structure, NR system, etc.) can be combined with methods proposed in the present disclosure to be described below, and/or supplemented to clarify technical features of the methods proposed in the present disclosure.

In the present disclosure, '( )' can be interpreted as both when excluding content in ( ) and when including content in parentheses. And/or, in the present disclosure, '( )' may mean a group of elements (or contents) in parentheses, or may mean the abbreviation/full name of the term before parentheses, and/or may mean writing contents before parentheses in English.

In the present disclosure, '/' can be interpreted as both when including all the contents separated by '/' (and) and when including only a part of the separated contents (or).

Figure 8:
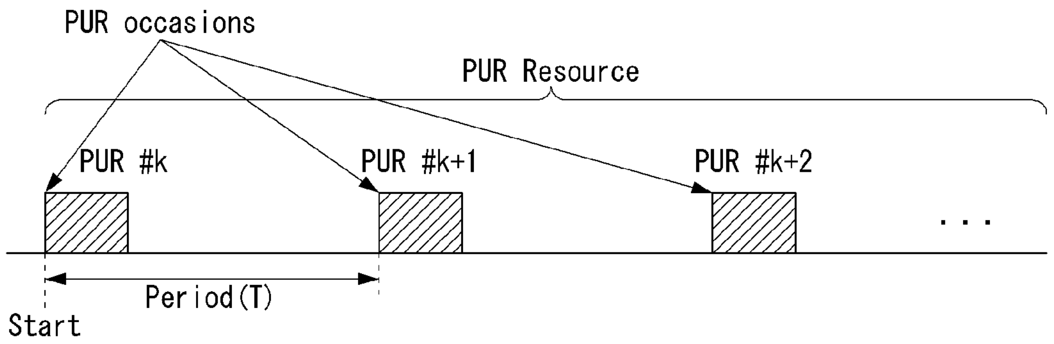
FIG. 8 illustrates a PUR transmission resource configuration.

FIG. 8 illustrates PUR transmission resource configuration.

As illustrated in FIG. 8, the PUR may be periodically configured through configuration parameters such as a starting point, a periodicity, and a transmission duration. In the present disclosure, time/frequency resource capable of periodically repeated PUR transmission may be referred to as a PUR occasion. And/or, a base station may configure the entire PUR transmission duration in units of time (e.g., ms, sec, slot, frame, hyper-frame, etc.) or the number of PUR occasions. In this instance, a configuration value may include infinity. When the configuration value is set to infinity, the UE may continue to perform the PUR transmission unless otherwise indicated by the BS.

In the present disclosure, the data transmission in the RRC_INACTIVE state may include data transmission in the RRC_IDLE state or may be replaced with the data transmission in the RRC_IDLE state.

In the present disclosure, the UL data transmission method in the RRC_INACTIVE state may include DL reception and/or UL transmission following UL data transmission.

First, the following describes a method of determining/selecting/updating an UL Tx beam when a UE intends to perform UL transmission using a preconfigured resource in an RRC_INACTIVE state in an NR system supporting a multi-beam (i.e., first embodiment).

First Embodiment

This embodiment describes a method of configuring and/or selecting/updating an UL Tx beam for PUR transmission in an NR system supporting a multi-beam.

Methods described below are merely distinguished for convenience of explanation. Thus, it is obvious that configuration of any method can be substituted or combined with configuration of another method.

For a PUR transmission in an NR multi-beam situation, a PUR support UE may need to determine an UL Tx beam to use on each PUR occasion before a PUR transmission time. As a method for the UE to determine the UL Tx beam for the PUR transmission, this embodiment may consider a method of using the UL Tx beam configured by a base station (BS) in the step (1) of the overall procedure described above, and a method for the UE itself to select the UL Tx beam.

Method 1-1

This method 1-1 is a method of transmitting a PUR using an UL Tx beam configured/re-configured by the BS (i.e., a configured beam scheme).

The UE may use an uplink (UL) transmit (Tx) beam configured/re-configured from the BS upon PUR transmission. If UL Tx beam information is configured in a PUR configuration configured by higher layer signaling, and/or if the UE is indicated to use the configured beam scheme (i.e., the method 1-1), the UE may perform the PUR transmission using a configured beam.

For example, operations of the BS and the UE for configuring/re-configuring the UL Tx beam to be used by the (PUR) UE may be as follows.

The BS may configure the UL Tx beam to be used by the UE for the PUR transmission through the PUR configuration in the step (1) of the overall procedure described above (and/or indicate to use the configured beam).

And/or, the UE may perform the PUR transmission using the UL Tx beam configured by the BS.

And/or, the BS may receive a receive (Rx) beam corresponding to the configured beam configured/re-configured through the PUR configuration in an Rx beam direction.

In the method 1-1, the UL Tx beam used by the UE upon the PUR transmission may be determined by the indication of the BS. Therefore, the method 1-1 has an effect of reducing power consumption by omitting a process of selecting the UL Tx beam from a UE perspective. The method 1-1 also has an effect of reducing BS complexity and power consumption that may occur when performing blind detection (BD) on multiple UL Tx beam directions from a BS perspective.

Method 1-2

This method 1-2 is a method for the UE to select an UL Tx beam and transmit a PUR (i.e., UE-selected beam scheme).

The PUR UE itself may select the UL Tx beam to be used upon the PUR transmission. In this instance, the UL Tx beam selected by the UE may be referred to as a UE-selected beam.

The UL Tx beam selection of the UE may be performed every PUR occasion or in a specific periodicity or condition. If there is no UL Tx beam information in the PUR configuration or if UL Tx beam information is present in the PUR configuration but the UE is indicated to select the UL Tx beam by higher layer signaling, the UE may use the UE-selected beam scheme.

For example, operations of the UE and the BS in the UE-selected beam scheme may be as follows.

The BS may indicate the UL Tx beam information not to be configured in the PUR configuration, and/or the UE itself to select the UL Tx beam for the PUR transmission through a separate parameter indicating the use of the UE-selected beam scheme.

And/or, if the UL Tx beam information is not configured in the PUR configuration, or if the UE is indicated to use the UE-selected beam scheme, the UE may select the UL Tx beam every PUR occasion or in a specific periodicity or condition and transmit the PUR.

And/or, the UE may report additionally the selected UL Tx beam.

And/or, the BS may receive the UL Tx beam through blind detection (BD) on all the UL Tx beam directions that the UE can select upon the PUR transmission. And/or, the BD may include BD for a case where the UE reports the UL Tx beam using a separate channel/signal.

For example, the UE may select the UL Tx beam using one of the following methods for the PUR transmission. That is, a method for the UE to select the UL Tx beam for the PUR transmission in the UE-selected beam scheme may be as follows.

(Method 1-2-1)

The UE may select an UL Tx beam equal or corresponding to an Rx beam used when the UE receives the most recent best SSB (from a reference signal received power (RSRP) perspective) before a PUR occasion to transmit.

(Method 1-2-2)

The UE may select the vary last UL Tx beam or DL Rx beam (direction) used or selected in the most recent RRC_CONNECTED state.

(Method 1-2-3)

The UE may select an UL Tx beam (direction) recently applying to a RACH Occasion (RO). And/or, the corresponding method may be applied only when the UE does not support a beam update procedure during the PUR transmission.

(Method 1-2-4)

The UE may select an UL Tx beam used (in first transmission or last transmission) in the previous PUR transmission. And/or, the corresponding method may be applied when an UL Tx beam update is supported.

The (PUR support) UE may select and use one of the above methods when selecting the UL Tx beam in the process of the PUR transmission operation.

For example, the (PUR) UE may enter into RRC_INACTIVE state for the PUR transmission and then select the UL Tx beam using the method 1-2-2 in the first PUR transmission or first PUSCH transmission of the first PUR to perform the PUR transmission, and may select and transmit the UL Tx beam in the method 1-2-4 for subsequent PUR occasions.

For another example, the PUR UE may enter into RRC_INACTIVE state for the PUR transmission and then select the UL Tx beam in the method 1-1 (i.e., the configured beam scheme) in the first PUR transmission or first PUSCH transmission of the first PUR, and may select and transmit or update the UL Tx beam in the method 1-2 (i.e., the UE-selected beam scheme) in subsequent transmission.

The method 1-2 has a disadvantage in that a BD burden of the BS increases compared to the method 1-1 of configuring a separate PUR per the UL Tx beam and allowing the BS to perform the BD. However, the method 1-2 has an effect of increasing the efficiency of resource use as a whole upon the PUR support in the NR system supporting the multi-beam operation by allowing the UL Tx beams for the PUR transmission to share PUR time/frequency resources.

Second Embodiment

This embodiment describes a method of configuring UL Tx beam selection/update periodicity or spacing.

Methods described below are merely distinguished for convenience of explanation. Thus, it is obvious that configuration of any method can be substituted or combined with configuration of another method.

When a (PUR support) UE performs an operation of determining/selecting an UL Tx beam every PUR occasion for PUR transmission in an NR multi-beam situation, there may occur problems such as UE complexity and excessive power consumption. To overcome these problems, the UL Tx beam selection and/or update of the UE may be performed every specific periodicity or spacing.

The UL Tx beam selection or update periodicity (or spacing) of the UE may be a unit of time such as ms, sec, etc. or may be a unit of slot or a unit of (hyper-)frame. And/or, the UL Tx beam selection or update periodicity (or spacing) of the UE may be a unit of PUR occasion (or uplink resource) (or a unit of PUR periodicity). The UL Tx beam selection or update periodicity (or spacing) of the UE may be a value configured by higher layer signaling/higher layer configuration so that the base station can configure it considering characteristics, etc. (e.g., fixed or mobile terminal, transmission periodicity, target cell coverage, etc.) of UE/service supporting the PUR transmission. In this case, the UL Tx beam selection or update periodicity (or spacing) of the UE may be configured through the PUR configuration in the step (1) of the overall PUR transmission procedure described above.

For example, when the UL Tx beam selection or update periodicity (or spacing) is a value set in units of PUR occasion (or PUR periodicity), the BS may indicate the UE to select or update the UL Tx beam every N-th PUR occasion (or PUR periodicity). That is, N may be to configure the UL Tx beam selection or update periodicity (or spacing). And/or, the BS may indicate the minimum or maximum periodicity (or spacing) at which the UE shall select or update the UL Tx beam. When N is the minimum periodicity (or spacing) of the UL Tx beam selection or update of the UE, the UE may not perform the UL Tx beam selection or update operation within N periodicity (or spacing). That is, the UE may need to maintain (i.e., transmit UL using the same spatial filter) the UL Tx beam that has been previously configured (i.e., the method 1-1) or is determined at a previous selection or update time (i.e., the method 1-2). In this instance, the BS may assume and use the same spatial filter during the N periodicity (or spacing).

And/or, when N is the maximum periodicity (or spacing) of the UL Tx beam selection and/or update of the UE, the UE may be requested to select or update one or more UL Tx beams every N periodicity (or spacing). And/or, the (additional) selection and/or update within N periodicity may be a UE option. The maximum periodicity (or spacing) may be a value set so that the base station can track the beam considering a channel environment or time for which the beam is maintained. On the other hand, the minimum periodicity (or spacing) may be a value set by the base station in order to limit the power consumed during the beam selection and update process.

For another example, the UL Tx beam selection or update operation of the UE may be performed only in some PUR occasions by dividing the PUR occasion which is repeated in units of PUR periodicity, and the most recently used UL Tx beam may be used without the UL Tx beam selection or update operation in remaining PUR occasions. In this case, the PUR occasion (or uplink resource) performing the UL Tx beam selection or update operation may be L (>=1) consecutive PUR occasions.

As an example of L=1, if the UL Tx beam selection and/or update periodicity is M1 PUR occasions, the UL Tx beam selection or update may be performed on (k1+1)-th (where k1=0, 1, . . . , M1−1) PUR occasion within M1 periodicity every M1 periodicity. And, the PUR transmission may be performed without the UL Tx beam selection or update in remaining (M1−1) PUR occasions.

As an example of L>1, if the UL Tx beam selection or update periodicity is M1 PUR occasions, the UL Tx beam selection or update may be performed on L consecutive PUR occasions starting on (k1+1)-th (where k1=0, 1, . . . , M1−1) PUR occasion within M1 periodicity every M1 periodicity. In this instance, in order to reduce the signaling overhead, M1 and k1 may be defined in units of L PUR occasions. In this case, when M and k values are ML and kL, respectively, the UE may perform the UL Tx beam selection or update on L consecutive PUR occasions starting at (kL*L+1))-th (where kL=0, 1, . . . , ML−1) PUR occasion within periodicity every periodicity of ML*L PUR occasions.

Figure 9:
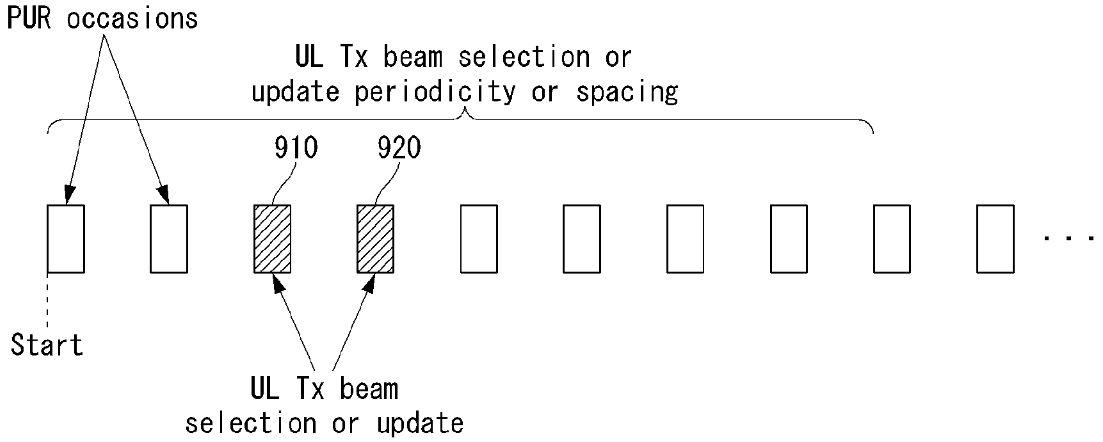
FIG. 9 illustrates configuration of periodicity/spacing of selecting/updating an UL Tx beam.

FIG. 9 illustrates when UL Tx beam selection/update periodicity or spacing configuration is L=2, ML=4, and kL=1.

Referring to FIG. 9, UL Tx beam selection/update may be performed on two consecutive PUR occasions (i.e., reference numerals 910 and 920 in FIG. 9) starting on a third (2*1+1) PUR occasion every 8 (=4*2) PUR occasions.

For example, in order to apply to both L=1 and L>1, the UE may be configured with information on the number (k) of uplink resources (e.g., PUR occasion) included in an uplink resource group, information on the number (l) of uplink resource groups, and information on an uplink resource group (m) for beam determination. For example, the Tx beam may be determined based on k uplink resources of an m-th uplink resource group for every 1 uplink resource groups. For example, if k=2, l=4, and m=2, referring to FIG. 9, the Tx beam may be determined/selected/updated in two uplink resources 910 and 920 (i.e., PUR occasions in FIG. 9) of a second uplink resource group for every 8 (=2*4) uplink resources (i.e., PUR occasions in FIG. 9). And/or, 'm' may have a value of 0, 1, 2 . . . , and in this case, the information on the uplink resource group (m) for beam determination may represent a (m+1)-th uplink resource group.

The values of Ml, kl, ML, kL, etc. may be fixed to a specific value (e.g., k=1), or may be included in a PUR configuration parameter so that the base station can control it considering the channel environment or time for which the beam is maintained and may be set by higher layer signaling.

Third Embodiment

This embodiment describes a method of performing beam sweeping for PUR transmission using a multi-beam in an NR system supporting the multi-beam.

Method 3-1

This method is a method of transmitting a PUR using a fixed UL Tx beam in the NR system supporting the multi-beam (i.e., BS Rx beam sweeping scheme).

A (PUR) UE may fix to an UL Tx beam (e.g., UE-selected beam) selected by the (PUR) UE itself and perform repetition transmission starting from a PUR occasion. And/or, a base station (BS) may perform Rx beam sweeping during a repetition transmission duration and acquire UL Tx beam information at the same time as PUR reception. For example, the PUR reception may mean receiving (uplink) channel/signal/data/information through uplink resource (i.e., PUR).

For example, the UE may repeat uplink (UL) transmission N times using the fixed UL Tx beam (e.g., UE-selected beam). Here, the repeatedly transmitted UL may be the same data. For example, N may be the number of synchronization signal block (SSB) beams. And/or, N may be configured by the BS considering the number of Tx beam supports reported by the UE and/or the number of BS Rx beam supports (or resolutions). And/or, N may be configured through PUR configuration.

And/or, the BS may perform PUR reception and optimal BS Rx beam determination by performing the Rx beam sweeping during the UL Tx duration repeated N times (i.e., by switching the Rx beam M (<=N) times).

And/or, the BS may transmit, to the determined optimal BS Rx beam or a BS Tx beam equal or corresponding to an Rx beam direction, downlink control information (DCI) for feedback (e.g., acknowledgement/negative acknowledgement (A/NA) information (or HARQ-ACK information), UL grant for reTx, DL assignment, etc.) through a PUR search space (SS). In this instance, the UE may assume a UE Rx beam equal or corresponding to the UL Tx beam for the PUR SS monitored after the UL Tx transmission (and subsequent DL transmission scheduled through the PUR SS). For example, the UE may assume the Rx beam used when receiving the most recent best SSB (from a RSRP perspective) before the PUR occasion. For example, in the present disclosure, the PUR SS may be referred to as a search space for a previously configured uplink resource or a search space for a pre-configured uplink resource.

And/or, the BS may transmit DCI for feedback (e.g., A/NA information (or HARQ-ACK information), UL grant for reTx, DL assignment, etc.) to best K Rx beam through the PUR SS. In this instance, the UE may need to attempt PDCCH reception for K PDCCH monitoring occasions. For example, K may be one or more integer values.

The method 3-1 is a method of performing the PUR transmission without going through a process of re-acquiring a beam through a random access channel (RACH) procedure when the same UL Tx beam cannot be assumed between PUR occasions due to large PUR periodicity, or the UL Tx beam of the UE is no longer valid due to UE movement or change in an beam environment.

(Method for UL Tx Beam Update)

And/or, the BS may indicate an UL Tx beam to be used in (the first) UL on a next or subsequent PUR occasion or PUSCH transmission using (a combination of) specific fields of feedback (e.g., A/N information (or HARQ-ACK information), UL grant for reTx, DL assignment, etc.) DCI transmitted to a PUR SS monitored by the UE after PUR transmission.

And/or, the BS may indicate an UL Tx beam to be used in (the first) UL on the next or subsequent PUR occasion or PUSCH transmission through a PDCCH search space associated with the UL Tx beam or DCI transmitted through a monitoring occasion.

And/or, the UE may use the UL Tx beam indicated in (the first) UL of the next or subsequent PUR occasion or PUSCH transmission. The BS may indicate a beam or a beam direction for UL retransmission or DL transmission by DCI scheduling in the same method as the RRC_CONNECTED state.

(Method for Rx Beam Sweeping Adaptation)

And/or, the BS may search for an optimal BS Rx beam through Rx beam sweeping using UL Tx (e.g., PUSCH transmission) repetition transmission (succeeding in transmission for the first time) within a PUR occasion, and then receive an optimal Rx beam (without the beam sweeping) in a subsequent Rx. In this instance, the UE may omit an UL Tx beam repetition for BS Rx beam sweeping for the purpose of power saving and efficient use of resources for UL Tx (e.g., PUSCH transmission) after the initially succeeding UL Tx (e.g., PUSCH transmission).

And/or, the UE UL Tx beam repetition and BS Rx beam sweeping operation and the Rx beam sweeping operation for Rx beam sweeping adaptation may be performed every N (>=1) PUR occasions for the UE/BS power saving. In this instance, N may be configured through the PUR configuration of the BS in the step (1) of the PUR transmission order.

Method 3-2

The method 3-2 is a method of transmitting a PUR using the UL Tx beam sweeping in the NR system supporting the multi-beam (i.e., UE Tx beam sweeping scheme).

The (PUR) UE may sweep and repeatedly transmit the UL Tx beam, and the BS may fix and receive the Rx beam. When the PUR UE performs the UL Tx beam sweeping, an initial UL Tx beam and/or a beam direction may be a configured beam or a UE-selected beam. And/or, when supporting the UL Tx beam update, the UL Tx beam and/or the UL Tx beam direction may be a most recently updated beam.

In the method 3-2, the UL repetition transmission may be to repeatedly transmit the same (PUSCH) data by switching the UL Tx beam. The repetition transmission number N may be the number of SSB beams. And/or, the repetition transmission number N may be configured through the PUR configuration of the BS considering the number of Tx beam supports (or resolutions) reported by the UE.

For example, the UE may repeatedly transmit the UL Tx beam by sweeping the UL Tx beam, and the BS may fix and receive the Rx beam. When the UE performs the UL Tx beam sweeping, an initial UL Tx beam or a beam direction may be a configured beam or a UE-selected beam. And/or, when supporting the UL Tx beam update, the UL Tx beam or the UL Tx beam direction may be a most recently updated beam. And/or, the repetition number N may be the number of SSB beams. And/or, the repetition number N may be configured through the PUR configuration of the BS considering the number of Tx beam supports (or resolutions) reported by the UE.

And/or, the BS may perform the PUR reception and the optimal UL Tx beam determination by receiving the fixed Rx beam N times.

For example, the method 3-2 may be an efficient method when beam correspondence between the BS and the UE is not valid, or when the UE does not support the selection/tracking of the UL Tx beam based on a DL RS or it is inaccurate. And/or, the method 3-2 may be a method applied before the BS receives (preferred) UL Tx beam information from the UE or when the BS does not receive the (preferred) UL Tx beam information from the UE and needs to determine the DL Tx beam. For this reason, the method 3-2 may be enabled only when the beam correspondence between the BS and the UE is not valid, or the UE does not support an operation of selecting/tracking and/or reporting the UL Tx beam based on the DL RS.

The method 3-2 may be applied only when the UE does not perform the UL beam validation and/or selection before the PUR transmission. And/or, the method 3-2 may be applied only when UL Tx power is less than a specific value as the UE approaches the BS considering an influence on a contiguous cell. For example, the UL Tx beam sweeping may be allowed/limited based on (combination of) conditions, such as a relative distance (e.g., timing advance (TA)) between the BS and the UE, the UL Tx power, and a beam width.

Figure 10:
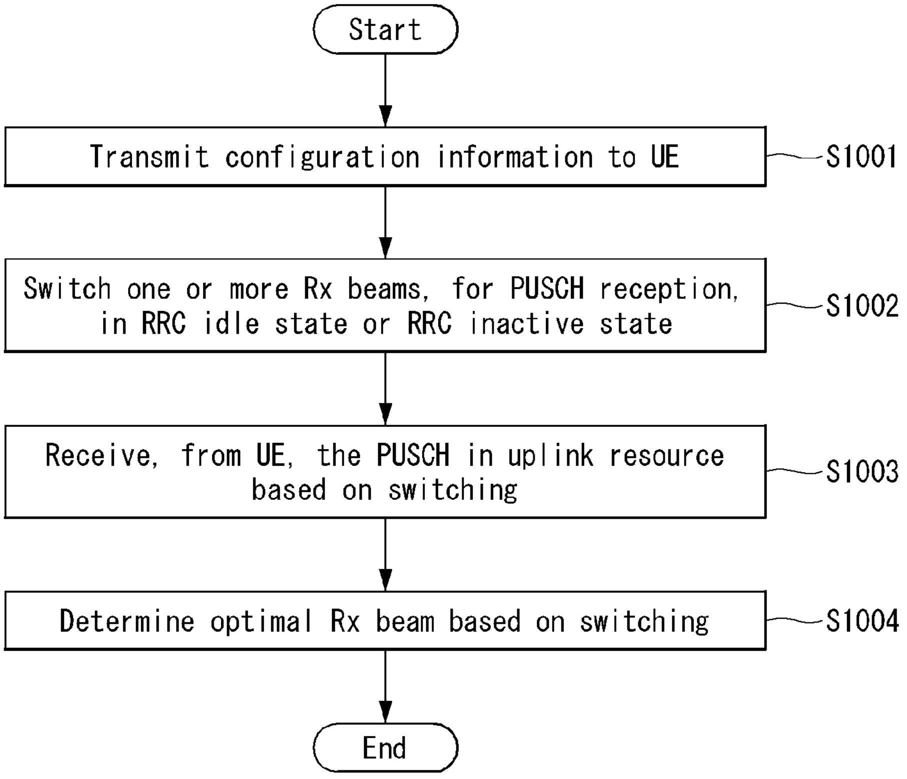
FIG. 10 is a flow chart illustrating an operation method of a base station described in the present disclosure.

FIG. 10 is a flow chart illustrating an operation method of a base station described in the present disclosure.

Referring to FIG. 10, a base station (BS) (100/200 of FIGS. 12 to 15) may transmit, to a user equipment (UE), configuration information including information for an uplink (UL) resource and information for transmit (Tx) beam, in step S1001. And/or, a transmit (Tx) beam of the UE may be determined/selected/updated based on the information for Tx beam. For example, the Tx beam may mean a plurality of Tx beams.

For example, the uplink resource may be a resource configured based on a configured grant and/or a resource configured for transmission of small data. And/or, the uplink resource may be a resource for transmission of small data based on a configured grant.

For example, the information for the uplink resource may include information for at least one uplink resource. And/or, the information for the uplink resource may include information representing time/frequency position/area for the uplink resource.

For example, the information for Tx beam may be information for performing the operation of the method 1-1 or the methods 1-2-1 to 1-2-4. The more detailed operation may refer to the first embodiment.

For example, an operation of the BS to transmit the configuration information in the step S1001 may be implemented by a device of FIGS. 12 to 15. For example, referring to FIG. 13, one or more processors 102/202 may control one or more memories 104/204 and/or one or more transceivers 106/206 so as to transmit the configuration information.

And/or, the BS (100/200 of FIGS. 12 to 15) may switch one or more receive (Rx) beams, for PUSCH reception, in a radio resource control (RRC) idle state or an RRC inactive state, in step S1002.

For example, a PUSCH may be repeatedly transmitted by the UE N times based on one transmit (Tx) beam. And/or, the number N of repetition transmissions may be the same as the number of synchronization signal block (SSB) beams, the number of Tx beams supported by the UE, or the number of Rx beams supported by the BS. The BS may switch a plurality of Rx beams while the UE performs the repetition transmission N (N>1) times, and may attempt a reception of the PUSCH. For example, the number of the plurality of Rx beams may be N, and the BS may switch the N Rx beams each time the UE performs the repetition transmission to receive the PUSCH or attempt the reception of the PUSCH.

For example, an operation of the BS to switch the one or more Rx beams in the step S1002 may be implemented by the device of FIGS. 12 to 15. For example, referring to FIG. 13, one or more processors 102/202 may control one or more memories 104/204 and/or one or more transceivers 106/206 so as to switch the one or more Rx beams.

And/or, the BS (100/200 of FIGS. 12 to 15) may receive, from the UE, the PUSCH in the uplink resource based on the switching, in step S1003.

For example, receiving the PUSCH may mean receiving data/information/small data, etc. through the PUSCH.

For example, an operation of the BS to receive the PUSCH in the step S1003 may be implemented by the device of FIGS. 12 to 15. For example, referring to FIG. 13, one or more processors 102/202 may control one or more memories 104/204 and/or one or more transceivers 106/206 so as to receive the PUSCH.

And/or, the BS (100/200 of FIGS. 12 to 15) may determine an optimal Rx beam based on the switching, in step S1004.

For example, the BS may switch the N Rx beams to perform the reception/reception attempt of the PUSCH N times, and determine/select/update at least one Rx beam in which a reference signal received power (RSRP) exceeds a preset value (or reference value) as an optimal Rx beam. And/or, even if the UE transmits the PUSCH N times, when the BS obtains/checks the Rx beam, in which the RSRP exceeds the preset value, before the reception/reception attempt of N times, the BS may determine the PUSCH reception/optimal Rx beam without the reception/reception attempt for the PUSCH of N times.

For another example, the BS may switch the N Rx beams to perform the reception/reception attempt of the PUSCH N times, and determine an Rx beam, in which a reference signal received power (RSRP) has a maximum value, as an optimal Rx beam.

And/or, the optimal Rx beam may be used for the uplink reception after the PUSCH reception.

And/or, the BS may transmit, to the UE, downlink control information (DCI) including hybrid automatic repeat request-acknowledgement (HARQ-ACK) information for the PUSCH. For example, after the BS successfully receives/decodes the PUSCH, the BS may transmit ACK information via the DCI. Alternatively, if the BS fails to receive/decode the PUSCH, the BS may allow the ACK information not to be included in the DCI, and/or negative ACK (NACK) information to be included in the DCI. And/or, if the BS fails to receive/decode the PUSCH, the BS may not transmit the DCI. And/or, if the UE receives the DCI not including the ACK information and/or including the NACK information, or fails to receive the DCI, the UE may retransmit the PUSCH.

And/or, the DCI may be transmitted based on a Tx beam corresponding to the optimal Rx beam. For example, the Tx beam corresponding to the optimal Rx beam may mean a downlink (DL) (Tx) beam of the same direction as the optimal Rx beam, and/or mean a (pre-configured/pre-defined) DL (Tx) beam corresponding to the optimal Rx beam.

And/or, the DCI may further include information for updating the Tx beam. For example, the information for updating the Tx beam may be information for a beam different from an UL Tx beam used for a previous PUSCH transmission. And/or, information for updating the (UL) Tx beam may be information for a (UL) Tx beam to be used after receiving the DCI or in a next uplink resource (e.g., PUR occasion).

If the corresponding DCI is received, the UE may transmit the PUSCH using a Tx beam by the DCI after receiving the DCI or in a next uplink resource.

For example, an operation of the BS to determine the optimal Rx beam in the step S1004 may be implemented by the device of FIGS. 12 to 15. For example, referring to FIG. 13, one or more processors 102/202 may control one or more memories 104/204 and/or one or more transceivers 106/206 so as to determine the optimal Rx beam.

The operation of the BS described with reference to FIG. 10 has been described focusing on the PUSCH, but can be applied to various uplink receptions such as physical uplink control channel (PUCCH)/data/information/small data.

Since the operation of the BS described with reference to FIG. 10 is the same as the operation of the BS described with reference to FIGS. 1 to 9 (e.g., the first to third embodiments), a detailed operation thereof is omitted.

The signaling and the operation described above may be implemented by a device (e.g., FIGS. 12 to 15) to be described below. For example, the signaling and the operation described above may be processed by one or more processors of FIGS. 12 to 15, and the signaling and the operation described above may be stored in a memory in the form of commands/programs (e.g., instructions, executable codes) for running at least one processor of FIGS. 12 to 15.

For example, a processing apparatus configured to control a base station (BS) to receive a PUSCH in a wireless communication system may comprise at least one processor, and at least one memory operably connected to the at least one processor, wherein the at least one memory may be configured to store instructions performing operations based on being executed by the at least one processor, wherein the operations may comprise transmitting, to a user equipment (UE), configuration information including information for an uplink resource and information for a transmit (Tx) beam, a Tx beam of the UE being determined based on the information for the Tx beam, switching one or more receive (Rx) beams, for a PUSCH reception, in a radio resource control (RRC) idle state or an RRC inactive state, receiving, from the UE, the PUSCH in the uplink resource based on the switching, and determining an optimal Rx beam based on the switching.

For example, in a computer readable storage medium storing at least one instruction, the at least one instruction may be configured to allow at least one processor to control operations based on being executed by the at least one processor, and the operations may comprise transmitting, to a user equipment (UE), configuration information including information for an uplink resource and information for a transmit (Tx) beam, a Tx beam of the UE being determined based on the information for the Tx beam, switching one or more receive (Rx) beams, for a physical uplink shared channel (PUSCH) reception, in a radio resource control (RRC) idle state or an RRC inactive state, receiving, from the UE, the PUSCH in the uplink resource based on the switching, and determining an optimal Rx beam based on the switching.

Figure 11:
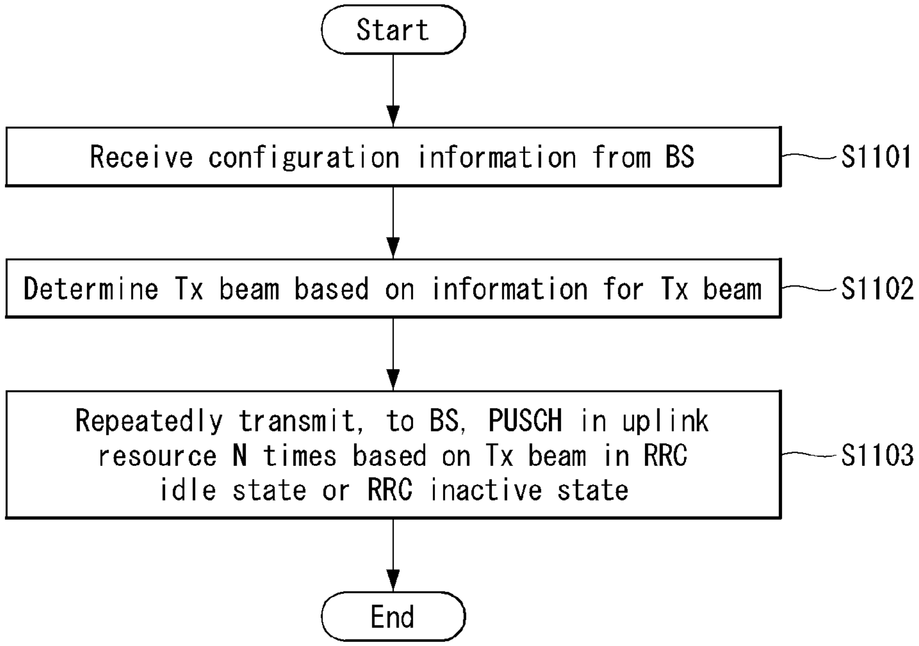
FIG. 11 is a flow chart illustrating an operation method of a UE described in the present disclosure.

FIG. 11 is a flow chart illustrating an operation method of a UE described in the present disclosure.

Referring to FIG. 11, a user equipment (UE) (100/200 of FIGS. 12 to 15) may receive, from a base station (BS), configuration information including information for an uplink (UL) resource and information for Tx beam, in step S1101.

For example, the uplink resource may be a resource configured based on a configured grant and/or a resource configured for transmission of small data. And/or, the uplink resource may be a resource for transmission of small data based on a configured grant.

For example, the information for the uplink resource may include information for at least one uplink resource. And/or, the information for the uplink resource may include information representing time/frequency position/area for the uplink resource.

For example, the information for Tx beam may be information for performing the operation of the method 1-1 or the methods 1-2-1 to 1-2-4. The more detailed operation may refer to the first embodiment.

For example, an operation of the UE to receive the configuration information in the step S1101 may be implemented by a device of FIGS. 12 to 15. For example, referring to FIG. 13, one or more processors 102/202 may control one or more memories 104/204 and/or one or more transceivers 106/206 so as to receive the configuration information.

And/or, the UE (100/200 of FIGS. 12 to 15) may determine/select/update a transmit (Tx) beam based on the information for Tx beam, in step S1102.

For example, the UE may determine at least one Tx beam among beams based on a reference signal received power (RSRP). And/or, the beams may be configured by the configuration information.

For another example, the UE may receive a plurality of synchronization signal blocks (SSBs) and determine an optimal SSB based on an RSRP of the plurality of SSBs. And/or, the UE may determine a Tx beam corresponding to a receive (Rx) beam used for reception of the optimal SSB, as a Tx beam for PUSCH.

For another example, the Tx beam may be a (UE) Tx beam corresponding to a (UE) receive (Rx) beam most recently used for a reception of a synchronization signal block (SSB). For example, the Tx beam corresponding to the Rx beam may mean an uplink (UL) (Tx) beam of the same direction as the Rx beam, and/or mean a (pre-configured/pre-defined) UL (Tx) beam corresponding to the Rx beam. And/or, the Tx beam may be a most recent Tx beam used in an RRC connected state. And/or, the Tx beam may be a Tx beam applied in a most recent random access channel resource. And/or, the Tx beam may be a most recent Tx beam used in an RRC idle state or an RRC inactive state. And/or, the more detailed operation may refer to the method 1-1 and the methods 1-2-1 to 1-2-4.

For example, an operation of the UE to determine the Tx beam in the step S1102 may be implemented by the device of FIGS. 12 to 15. For example, referring to FIG. 13, one or more processors 102/202 may control one or more memories 104/204 and/or one or more transceivers 106/206 so as to determine the Tx beam.

And/or, the UE (100/200 of FIGS. 12 to 15) may repeatedly transmit, to the BS, the PUSCH in the uplink resource N times based on the Tx beam in a radio resource control (RRC) idle state or an RRC inactive state, in step S1103.

For example, transmitting the PUSCH may mean transmitting data/information/small data, etc. through the PUSCH.

For example, the number N of repetition transmissions may be the same as the number of synchronization signal block (SSB) beams, the number of Tx beams supported by the UE, or the number of Rx beams supported by the BS. The BS may switch a plurality of Rx beams while the UE performs the repetition transmission N (N>1) times, and may attempt a reception of the PUSCH. For example, the number of the plurality of Rx beams may be N, and the BS may switch the N Rx beams each time the UE performs the repetition transmission to receive the PUSCH or attempt the reception of the PUSCH.

And/or, the PUSCH may be received based on the switching of the BS.

And/or, the optimal Rx beam of the BS may be determined based on the switching of the BS.

For example, the BS may switch the N Rx beams to perform the reception/reception attempt of the PUSCH N times, and determine/select/update at least one Rx beam in which a reference signal received power (RSRP) exceeds a preset value (or reference value) as an optimal Rx beam. And/or, even if the UE transmits the PUSCH N times, when the BS obtains/checks the Rx beam, in which the RSRP exceeds the preset value, before the reception/reception attempt of N times, the BS may determine the PUSCH reception/optimal Rx beam without the reception/reception attempt for the PUSCH of N times.

For another example, the BS may switch the N Rx beams to perform the reception/reception attempt of the PUSCH N times, and determine an Rx beam, in which a reference signal received power (RSRP) has a maximum value, as an optimal Rx beam.

And/or, the optimal Rx beam may be used by the BS for the uplink reception after the PUSCH reception.

And/or, the UE may receive, from the BS, downlink control information (DCI) including hybrid automatic repeat request-acknowledgement (HARQ-ACK) information for the PUSCH. For example, after the BS successfully receives/decodes the PUSCH, the BS may transmit ACK information via the DCI. Alternatively, if the BS fails to receive/decode the PUSCH, the BS may allow the ACK information not to be included in the DCI, and/or negative ACK (NACK) information to be included in the DCI. And/or, if the BS fails to receive/decode the PUSCH, the BS may not transmit the DCI. And/or, if the UE receives the DCI not including the ACK information and/or including the NACK information, or fails to receive the DCI, the UE may retransmit the PUSCH.

And/or, the DCI may be transmitted by the BS based on a Tx beam corresponding to the optimal Rx beam. For example, the Tx beam corresponding to the optimal Rx beam may mean a downlink (DL) (Tx) beam of the same direction as the optimal Rx beam, and/or mean a (pre-configured/pre-defined) DL (Tx) beam corresponding to the optimal Rx beam.

And/or, the DCI may further include information for updating the Tx beam. For example, the information for updating the Tx beam may be information for a beam different from an UL Tx beam used for a previous PUSCH transmission. And/or, information for updating the (UL) Tx beam may be information for a (UL) Tx beam to be used after receiving the DCI or in a next uplink resource (e.g., PUR occasion).

And/or, if the corresponding DCI is received, the UE may transmit the PUSCH using a Tx beam by the DCI after receiving the DCI or in a next uplink resource.

For example, an operation of the UE to transmit the PUSCH in the step S1103 may be implemented by the device of FIGS. 12 to 15. For example, referring to FIG. 13, one or more processors 102/202 may control one or more memories 104/204 and/or one or more transceivers 106/206 so as to transmit the PUSCH.

The operation of the UE described with reference to FIG. 11 has been described focusing on the PUSCH, but can be applied to various uplink transmissions such as physical uplink control channel (PUCCH)/data/information/small data.

Since the operation of the UE described with reference to FIG. 11 is the same as the operation of the UE described with reference to FIGS. 1 to 10 (e.g., the first to third embodiments), a detailed operation thereof is omitted.

The signaling and the operation described above may be implemented by a device (e.g., FIGS. 12 to 15) to be described below. For example, the signaling and the operation described above may be processed by one or more processors of FIGS. 12 to 15, and the signaling and the operation described above may be stored in a memory in the form of commands/programs (e.g., instructions, executable codes) for running at least one processor of FIGS. 12 to 15.

For example, a processing apparatus configured to control a user equipment (UE) to transmit a PUSCH in a wireless communication system may comprise at least one processor, and at least one memory operably connected to the at least one processor, wherein the at least one memory may be configured to store instructions performing operations based on being executed by the at least one processor, wherein the operations may comprise receiving, from a base station (BS), configuration information including information for an uplink resource and information for a transmit (Tx) beam, determining a Tx beam based on the information for the Tx beam, and repeatedly transmitting, to the BS, the PUSCH in the uplink resource N times based on the Tx beam in a radio resource control (RRC) idle state or an RRC inactive state, wherein the PUSCH may be received based on a switching of the BS, and wherein an optimal Rx beam of the BS may be determined based on the switching of the BS.

For example, in a computer readable storage medium storing at least one instruction, the at least one instruction may be configured to allow at least one processor to control operations based on being executed by the at least one processor, and the operations may comprise receiving, from a base station (BS), configuration information including information for an uplink resource and information for a transmit (Tx) beam, determining a Tx beam based on the information for the Tx beam, and repeatedly transmitting, to the BS, a physical uplink shared channel (PUSCH) in the uplink resource N times based on the Tx beam in a radio resource control (RRC) idle state or an RRC inactive state, wherein the PUSCH may be received based on a switching of the BS, and wherein an optimal Rx beam of the BS may be determined based on the switching of the BS.

Example of Communication System to which the Present Disclosure is Applied

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 11 shows a communication system 1 based on an embodiment of the present disclosure.

Referring to FIG. 11, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device to which the Present Disclosure is Applied

Figure 12:
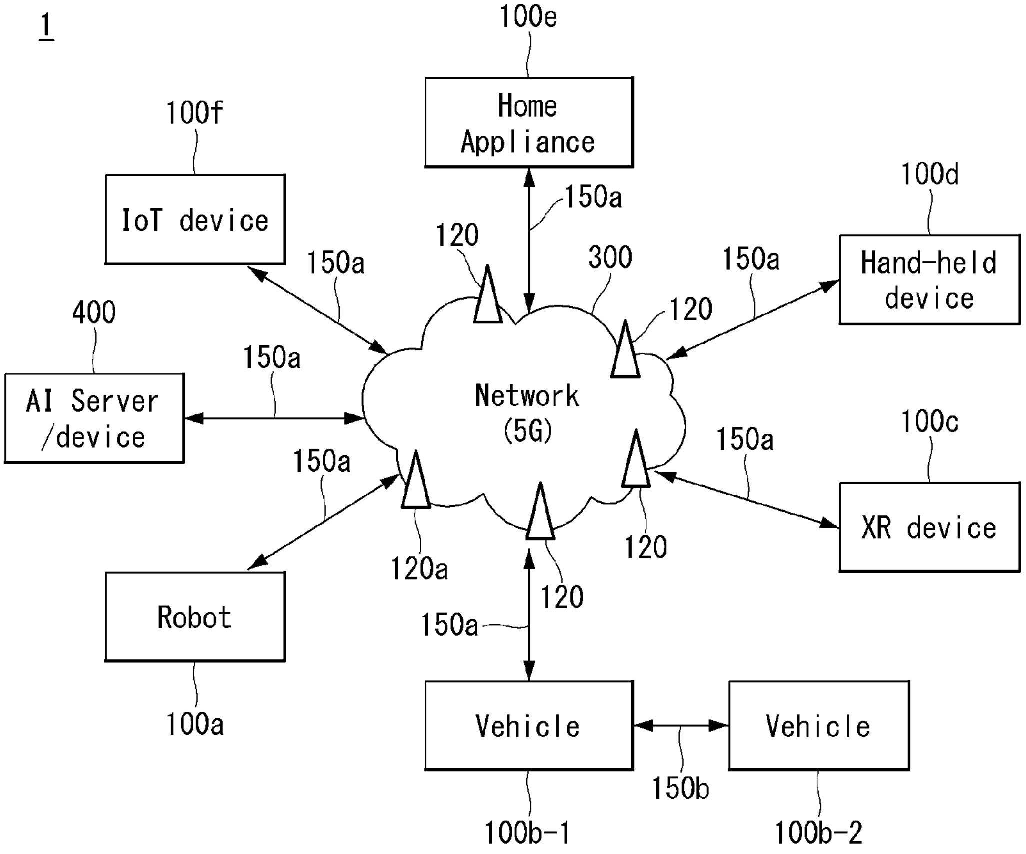
FIG. 12 illustrates a communication system (1) applied to the present disclosure.

FIG. 12 illustrates wireless devices based on an embodiment of the present disclosure.

Referring to FIG. 12, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 11.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) based on the descriptions, functions, procedures, proposals, methods, and/or operational flowcharts disclosed in this document. The one or more processors 102 and 202 may generate messages, control information, data, or information based on the descriptions, functions, procedures, proposals, methods, and/or operational flowcharts disclosed in this document. The one or more processors 102 and 202 may generate signals (e.g., baseband signals) including PDUs, SDUs, messages, control information, data, or information based on the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information based on the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 13:
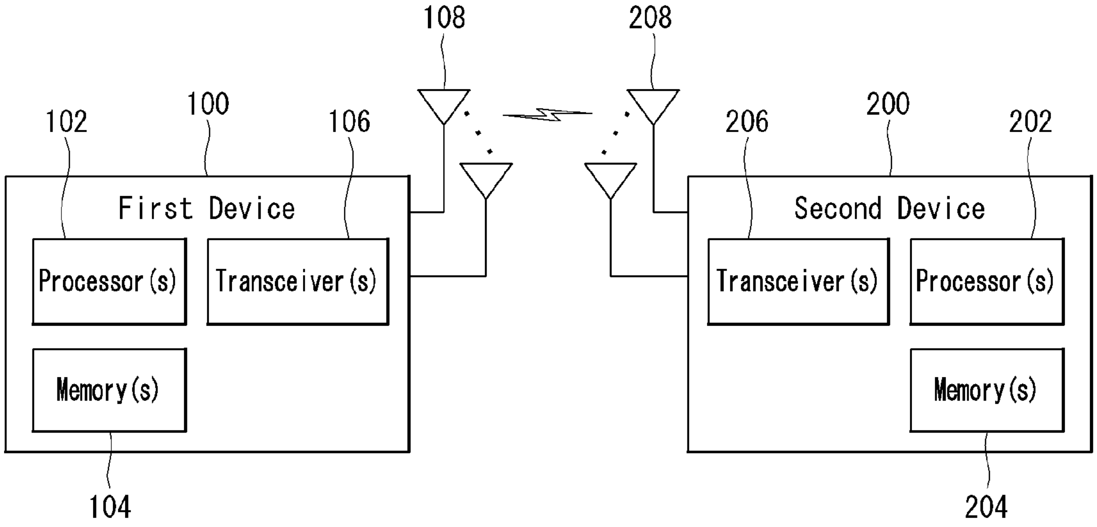
FIG. 13 illustrates a wireless device applicable to the present disclosure.

Application Example of Wireless Device to which the Present Disclosure is is Applied FIG. 13 illustrates another example of a wireless device based on an embodiment of the present disclosure. The wireless device may be implemented in various forms based on a use-case/service.

Referring to FIG. 13, wireless devices 100 and 200 may correspond to the wireless devices 100 and 200 of FIG. 12 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 12. For example, the transceiver(s) 114 may include the one or more transceivers 106 and 206 and/or the one or more antennas 108 and 208 of FIG. 12. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured based on types of wireless devices. For example, the additional components 140 may include at least one of a power unit/battery, input/output (I/O) unit, a driving unit, and a computing unit. The wireless device may be implemented in the form of, without being limited to, the robot (100$a$ of FIG. 11), the vehicles (100$b$-1 and 100$b$-2 of FIG. 11), the XR device (100$c$ of FIG. 11), the hand-held device (100*d* of FIG. 11), the home appliance (100*e* of FIG. 11), the IoT device (100*f* of FIG. 11), a digital broadcast terminal, a hologram device, a public safety device, an MTC device, a medicine device, a fintech device (or a finance device), a security device, a climate/environment device, the AI server/device (400 of FIG. 11), the BSs (200 of FIG. 11), a network node, etc. The wireless device may be used in a mobile or fixed place based on a use-example/service.

In FIG. 13, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Mobile Device to which the Present Disclosure is Applied

Figure 14:
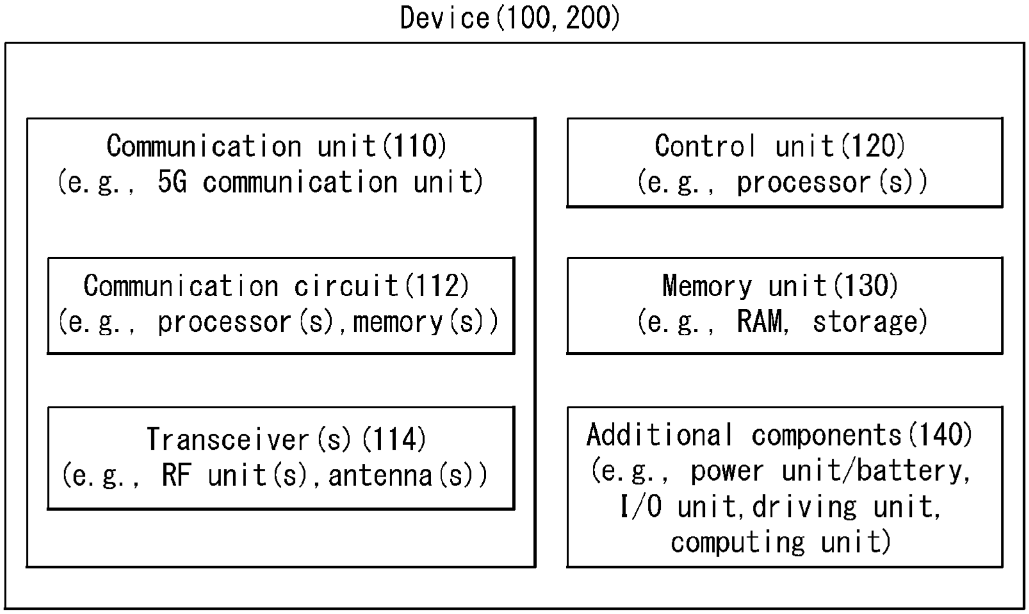
FIG. 14 illustrates another example of a wireless device applied to the present disclosure.
Figure 15:
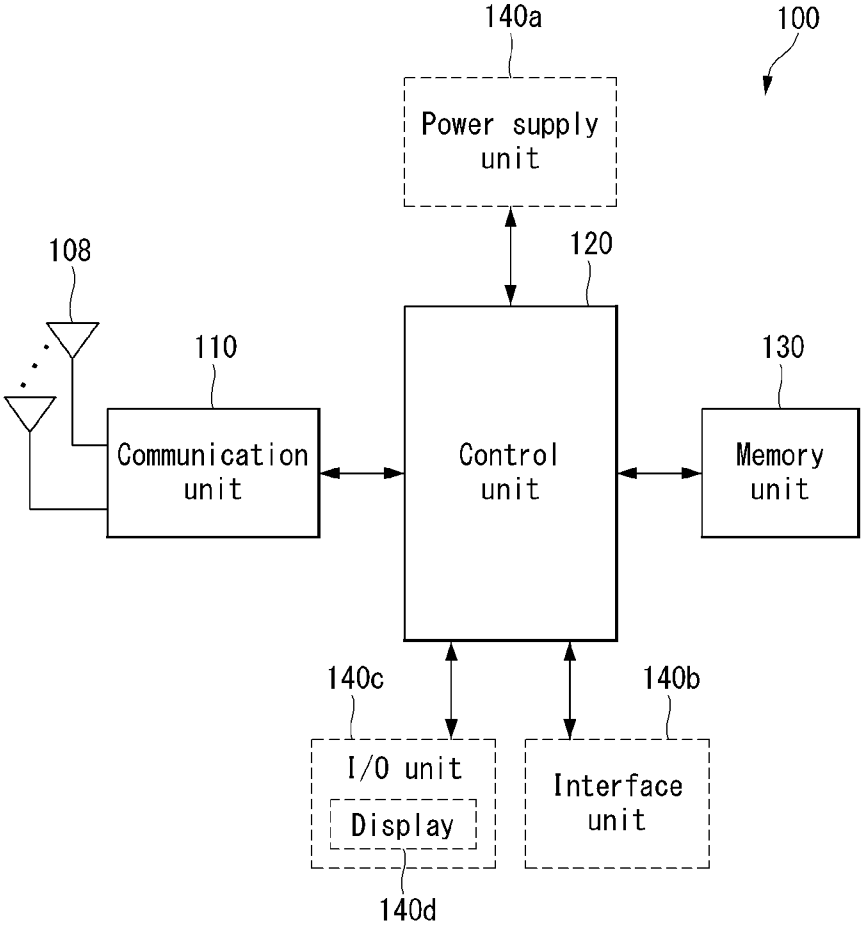
FIG. 15 illustrates a portable device applied to the present disclosure.

FIG. 14 shows a hand-held device based on an embodiment of the present disclosure. The hand-held device may include a smartphone, a smart pad, a wearable device (e.g., a smart watch or a smart glasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 14, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 13, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

A wireless communication technology implemented by a wireless device (e.g., 100, 200) according to the present disclosure may include narrowband Internet of Things for low power communication in addition to LTE, NR and 6G. In this case, for example, the NB-IoT technology may be an example of a low power wide area network (LPWAN) technology and may be implemented by standards such as LTE Cat NB1 and/or LTE Cat NB2, and the present disclosure is not limited to the aforementioned names. Additionally or alternatively, the wireless communication technology implemented by the wireless device (e.g., 100, 200) according to the present disclosure may perform communication based on the LTE-M technology. In this case, for example, the LTE-M technology may be an example of the LPWAN technology and may be called various names, such as enhanced Machine Type Communication (eMTC). For example, the LTE-M technology may be implemented by at least one of various standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and the present disclosure is not limited to the aforementioned names. Additionally or alternatively, the wireless communication technology implemented by the wireless device (e.g., 100, 200) according to the present disclosure may include at least one of ZigBee, Bluetooth and a low power wide area network (LPWAN) in which low power communication is considered, and the present disclosure is not limited to the aforementioned names. For example, the ZigBee technology may generate personal area networks (PAN) related to small/low-power digital communication based on various standards such as IEEE 802.15.4, and may be called various names.

The embodiments described above are implemented by combinations of components and features of the present disclosure in predetermined forms. Each component or feature should be considered selectively unless specified separately. Each component or feature can be carried out without being combined with another component or feature. Moreover, some components and/or features are combined with each other and can implement embodiments of the present disclosure. The order of operations described in embodiments of the present disclosure can be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the above detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

Although a method of transmitting and receiving a PUSCH in a wireless communication system according to the present disclosure has been described focusing on examples applying to the 3GPP LTE/LTE-A system and 5G system (new RAT system), the present disclosure can be applied to various wireless communication systems, such as beyond 5G, 6G, and beyond 6G, in addition to the systems described above.

What is claimed is:

1. A method of receiving, by a base station (BS), a physical uplink shared channel (PUSCH) in a wireless communication system, the method comprising:

transmitting, to a user equipment (UE), configuration information including information for an uplink resource and information for a transmit (Tx) beam, wherein a Tx beam of the UE is determined based on the information for the Tx beam, and wherein the uplink resource corresponds to a preconfigured uplink resource (PUR) configured to the UE in a radio resource control (RRC) connected state and used for PUSCH transmission while the UE remains in a radio resource control (RRC) idle state or an RRC inactive state without transition to the RRC connected state during the PUSCH transmission;

switching one or more receive (Rx) beams based on a plurality of transmissions of the PUSCH from the UE using the Tx beam, for a PUSCH reception, in an RRC idle state or an RRC inactive state, wherein different Rx beams are applied to different ones of the plurality of transmissions of the PUSCH in the uplink resource;

receiving, from the UE, the PUSCH in the uplink resource based on the switching, wherein receiving the PUSCH includes performing Rx beam sweeping at the BS during the plurality of transmissions of the PUSCH while the UE maintains the Tx beam; and determining, as an optimal Rx beam, at least one Rx beam based on a reference signal received power (RSRP) exceeding a predetermined value or based on RSRP having a maximum value among RSRP values obtained for the one or more Rx beams during the plurality of transmissions of the PUSCH.

2. The method of claim 1, wherein the optimal Rx beam is used for an uplink reception after the PUSCH reception.

3. The method of claim 1, further comprising:

transmitting, to the UE, downlink control information (DCI) including hybrid automatic repeat request-acknowledgement (HARQ-ACK) information for the PUSCH.

4. The method of claim 3, wherein the DCI is transmitted based on a Tx beam related to the optimal Rx beam.

5. The method of claim 3, wherein the DCI further includes information for updating the Tx beam of the UE.

6. The method of claim 1, wherein the PUSCH is repeatedly transmitted by the UE N times based on one Tx beam.

7. The method of claim 6, wherein the number N of repetition transmissions is the same as a number of synchronization signal block (SSB) beams, a number of Tx beams supported by the UE, or a number of Rx beams supported by the BS.

8. A base station (BS) configured to receive a physical uplink shared channel (PUSCH) in a wireless communication system, the BS comprising:

at least one transceiver;

at least one processor; and at least one memory operably connected to the at least one processor, wherein the at least one memory is configured to store instructions that allow the at least one processor to perform operations based on being executed by the at least one processor, wherein the operations comprise:

transmitting, to a user equipment (UE), configuration information including information for an uplink resource and information for a transmit (Tx) beam, wherein a Tx beam of the UE is determined based on the information for the Tx beam, and wherein the uplink resource corresponds to a preconfigured uplink resource (PUR) configured to the UE in a radio resource control (RRC) connected state and used for PUSCH transmission while the UE remains in a radio resource control (RRC) idle state or an RRC inactive state without transition to the RRC connected state during the PUSCH transmission;

switching one or more receive (Rx) beams based on a plurality of transmissions of the PUSCH from the UE using the Tx beam, for a PUSCH reception, in an RRC idle state or an RRC inactive state, wherein different Rx beams are applied to different ones of the plurality of transmissions of the PUSCH in the uplink resource;

receiving, from the UE, the PUSCH in the uplink resource based on the switching, wherein receiving the PUSCH includes performing Rx beam sweeping at the BS during the plurality of transmissions of the PUSCH while the UE maintains the Tx beam; and determining, as an optimal Rx beam, at least one Rx beam based on a reference signal received power (RSRP) exceeding a predetermined value or based on RSRP having a maximum value among RSRP values obtained for the one or more Rx beams during the plurality of transmissions of the PUSCH.

9. The BS of claim 8, wherein the optimal Rx beam is used for an uplink reception after the PUSCH reception.

10. The BS of claim 8, wherein the operations further comprise:

transmitting, to the UE, downlink control information (DCI) including hybrid automatic repeat request-acknowledgement (HARQ-ACK) information for the PUSCH.

11. A method of transmitting, by a user equipment (UE), a physical uplink shared channel (PUSCH) in a wireless communication system, the method comprising:

receiving, from a base station (BS), configuration information including information for an uplink resource and information for a transmit (Tx) beam, wherein the uplink resource corresponds to a preconfigured uplink resource (PUR) configured to the UE in a radio resource control (RRC) connected state and used for PUSCH transmission while the UE remains in a radio resource control (RRC) idle state or an RRC inactive state without transition to the RRC connected state during the PUSCH transmission;

determining a Tx beam based on the information for the Tx beam; and repeatedly transmitting, to the BS, the PUSCH in the uplink resource based on the Tx beam in an RRC idle state or an RRC inactive state, wherein a plurality of transmissions of the PUSCH in the uplink resource are provided while the UE maintains the Tx beam to enable Rx beam sweeping at the BS using different receive beams for different ones of the plurality of transmissions, wherein the PUSCH is received based on a switching of the BS, and wherein an optimal Rx beam of the BS is determined as at least one Rx beam based on a reference signal received power (RSRP) exceeding a predetermined value or based on RSRP having a maximum value among RSRP values obtained for the one or more Rx beams during the plurality of transmissions of the PUSCH.

12. The method of claim 11, wherein the number of repetition transmissions is the same as a number of synchronization signal block (SSB) beams, a number of Tx beams supported by the UE, or a number of Rx beams supported by the BS.

13. The method of claim 11, wherein the optimal Rx beam is used by the BS for an uplink reception after a PUSCH reception.

14. The method of claim 11, further comprising:

receiving, from the BS, downlink control information (DCI) including hybrid automatic repeat request-acknowledgement (HARQ-ACK) information for the PUSCH.

15. The method of claim 14, wherein the DCI is transmitted by the BS based on a Tx beam related to the optimal Rx beam.

16. The method of claim 14, wherein the DCI further includes information for updating the Tx beam.

17. A user equipment (UE) configured to transmit a physical uplink shared channel (PUSCH) in a wireless communication system, the UE comprising:

at least one transceiver;

at least one processor; and at least one memory operably connected to the at least one processor, wherein the at least one memory is configured to store instructions that allow the at least one processor to perform operations based on being executed by the at least one processor, wherein the operations comprise:

receiving, from a base station (BS), configuration information including information for an uplink resource and information for a transmit (Tx) beam, wherein the uplink resource corresponds to a preconfigured uplink resource (PUR) configured to the UE in a radio resource control (RRC) connected state and used for PUSCH transmission while the UE remains in a radio resource control (RRC) idle state or an RRC inactive state without transition to the RRC connected state during the PUSCH transmission;

determining a Tx beam based on the information for the Tx beam; and repeatedly transmitting, to the BS, the PUSCH in the uplink resource based on the Tx beam in an RRC idle state or an RRC inactive state, wherein a plurality of transmissions of the PUSCH in the uplink resource are provided while the UE maintains the Tx beam to enable Rx beam sweeping at the BS using different receive beams for different ones of the plurality of transmissions, wherein the PUSCH is received based on a switching of the BS, and wherein an optimal Rx beam of the BS is determined as at least one Rx beam based on a reference signal received power (RSRP) exceeding a predetermined value or based on RSRP having a maximum value among RSRP values obtained for the one or more Rx beams during the plurality of transmissions of the PUSCH.

18. The UE of claim 17, wherein the optimal Rx beam is used for an uplink reception after the PUSCH reception.

19. The UE of claim 17, wherein the PUSCH is repeatedly transmitted by the UE N times based on one Tx beam.

20. The UE of claim 19, wherein the number of repetition transmissions is the same as a number of synchronization signal block (SSB) beams, a number of Tx beams supported by the UE, or a number of Rx beams supported by the BS.

* * * * *